US012471520B2

(12) United States Patent
Gilstring et al.

(10) Patent No.: US 12,471,520 B2
(45) Date of Patent: Nov. 18, 2025

(54) ROW UNIT, AGRICULTURAL IMPLEMENT COMPRISING ROW UNIT AND METHOD OF OPERATING ROW UNIT

(71) Applicant: Väderstad Holding AB, Väderstad (SE)

(72) Inventors: Gert Gilstring, Vadstena (SE); Crister Stark, Väderstad (SE); Rune Rommedahl, Ljungsbro (SE); Per-Arne Hagby, Ödeshög (SE)

(73) Assignee: Väderstad Holding AB, Väderstad (SE)

( * ) Notice: Subject to any disclaimer, the term of this patent is extended or adjusted under 35 U.S.C. 154(b) by 844 days.

(21) Appl. No.: 17/771,099

(22) PCT Filed: Oct. 21, 2020

(86) PCT No.: PCT/SE2020/051019
§ 371 (c)(1),
(2) Date: Apr. 22, 2022

(87) PCT Pub. No.: WO2021/080494
PCT Pub. Date: Apr. 29, 2021

(65) Prior Publication Data
US 2022/0377968 A1    Dec. 1, 2022

(30) Foreign Application Priority Data
Oct. 24, 2019   (SE) .................................. 1951214-4

(51) Int. Cl.
*A01C 7/20*    (2006.01)
*A01B 63/00*   (2006.01)

(52) U.S. Cl.
CPC ............ *A01C 7/203* (2013.01); *A01B 63/008* (2013.01); *A01C 7/205* (2013.01)

(58) Field of Classification Search
CPC ........... A01C 7/203; A01C 7/201; A01C 7/20; A01C 7/00; A01C 7/205; A01B 63/008; A01B 63/002; A01B 63/00
See application file for complete search history.

(56) References Cited

U.S. PATENT DOCUMENTS 3,749,035 A  *  7/1973  Cayton .................. A01C 7/205
                                                          111/926
4,250,968 A       2/1981  Fox
(Continued)

FOREIGN PATENT DOCUMENTS

AU    2018202048 A1    10/2018
CN    110192457 A       9/2019
(Continued)

*Primary Examiner* — Christopher J. Novosad
(74) *Attorney, Agent, or Firm* — COATS & BENNETT, PLLC

(57) ABSTRACT

An agricultural implement includes a row unit (2) for feeding granular material to the ground. The row unit has a seed furrow-opener, which has a seed furrow-opening arm (21) carrying a seed disc (22). The seed furrow-opening arm has a proximal portion, in which the seed furrow-opening arm is pivotable about a first geometrical axis (Rb) and a distal portion, to which the seed disc is rotatably attached. The row unit has a depth regulator, which has a depth-regulating arm (31) carrying a gauge wheel (32). The depth-regulating arm (31) is pivotable about a second geometrical axis (Ra) which is concentric with a centre of rotation for the seed disc. The row unit comprises a first adjusting device for setting the height of the gauge wheel (32) in relation to the seed disc (22). The first adjusting device comprises a lever (34), which is fixedly connected to the depth-regulating arm, a depth-regulating driver arm (36) pivotable at the first geometrical axis, and a control link (35), which connects distal portions of the lever (34) and the depth-regulating driver arm (36), so that the pivotal position (Continued)

of the lever is controllable by pivoting the depth-regulating driver arm.

19 Claims, 19 Drawing Sheets

(56) References Cited

U.S. PATENT DOCUMENTS

| | | | |
|---|---|---|---|
| 5,829,535 | A | 11/1998 | Line |
| 6,148,747 | A | 11/2000 | Deckler et al. |
| 6,701,857 | B1 | 3/2004 | Jensen et al. |
| 2007/0272134 | A1 | 11/2007 | Baker et al. |
| 2011/0005439 | A1 | 1/2011 | Patwardhan et al. |
| 2011/0107949 | A1 | 5/2011 | Schilling |
| 2011/0282556 | A1 | 11/2011 | Klenz et al. |
| 2015/0020721 | A1 | 1/2015 | Silbernagel et al. |
| 2016/0050841 | A1 | 2/2016 | Tobin et al. |
| 2019/0289768 | A1 | 9/2019 | Kowalchuck |
| 2020/0359546 | A1 * | 11/2020 | Ptacek ............... A01B 63/32 |

FOREIGN PATENT DOCUMENTS

| | | |
|---|---|---|
| DE | 102007028193 A1 | 12/2008 |
| EP | 1326489 B1 | 12/2004 |
| EP | 1774844 A2 | 4/2007 |
| EP | 2005811 A2 | 12/2008 |
| EP | 2255608 A1 | 12/2010 |
| EP | 3214914 A1 | 9/2017 |
| GB | 1601779 A | 11/1981 |
| SE | 518975 C2 | 12/2002 |
| SE | 543694 C2 | 6/2021 |
| WO | 9831210 A1 | 7/1998 |
| WO | 2020232344 A1 | 11/2020 |
| WO | 2021080494 A1 | 4/2021 |

* cited by examiner

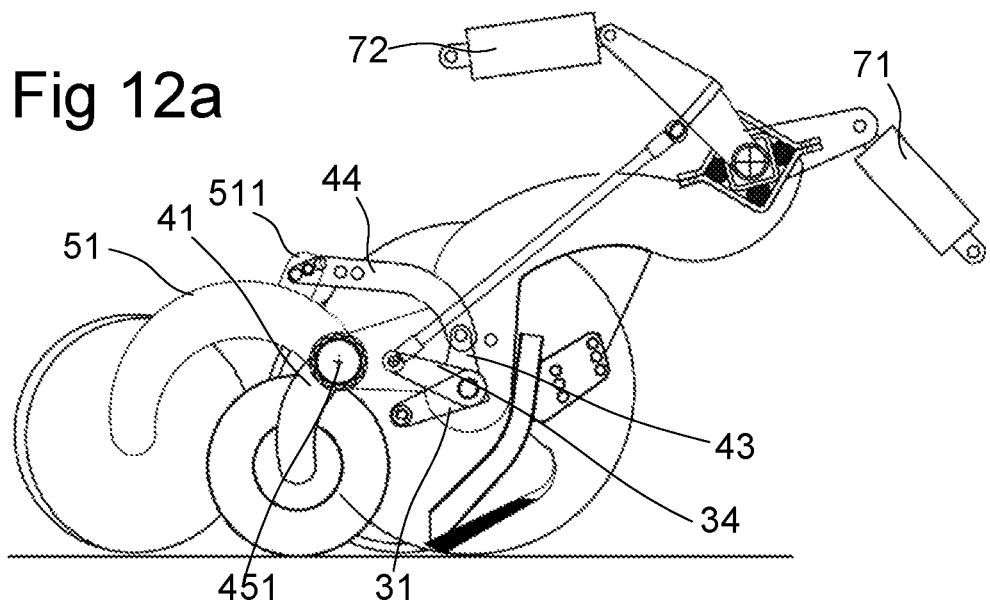
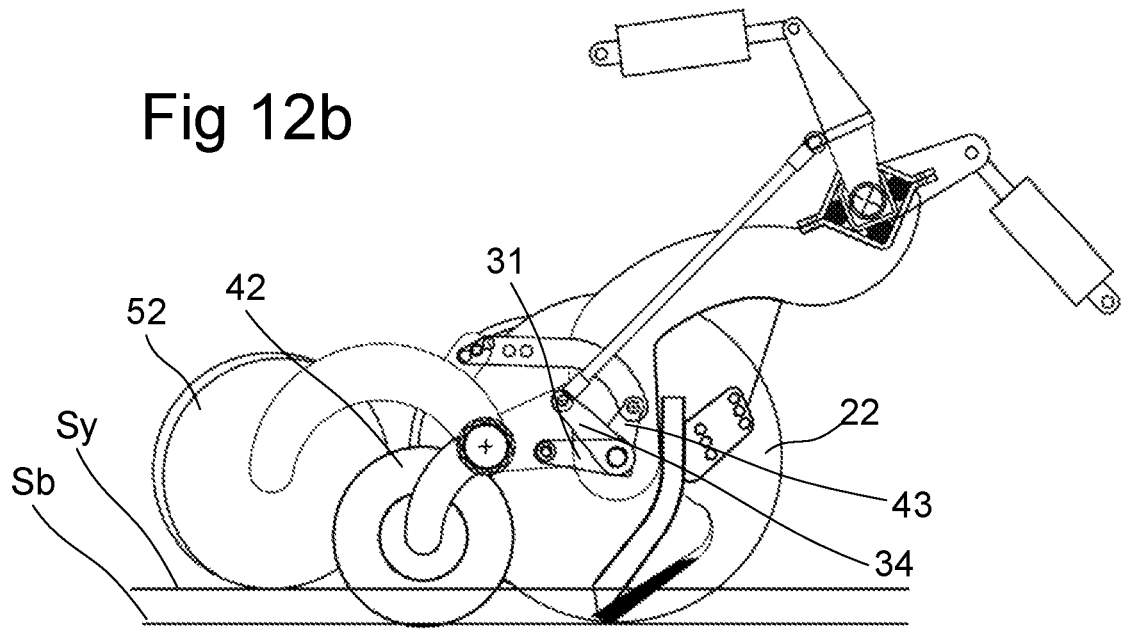

ROW UNIT, AGRICULTURAL IMPLEMENT COMPRISING ROW UNIT AND METHOD OF OPERATING ROW UNIT

TECHNICAL FIELD

This document discloses a row unit for an agricultural implement, an agricultural implement comprising a number of such row units and a method of setting the ground pressure and the drilling depth of a row unit.

BACKGROUND

Agricultural implements for sowing, which comprise a number of row units, each comprising a seed furrow-opener, a depth regulator, a furrow opener and a seed furrow-sealer, are known. Such agricultural implements can also comprise any form of pressure means for pressing down seed placed in an opened seed furrow.

Such row units are common in so-called "precision seed drills" or "planters", i.e. seed drills which place each seed at a predetermined distance from the adjacent seed, but also in common seed drills with volumetric feeding.

It is desirable to provide row units that are compact, viewed in the transverse direction of the agricultural implement, especially in seed drills with volumetric feeding which are used for sowing crops at a small distance between the seed rows.

It is also desirable to be able to control the drilling depth with good precision. It is known to control the drilling depth by setting the vertical position of a depth regulator in a certain relationship to the vertical position of a seed furrow-opener. In addition, it is known to set the drilling depth by controlling the force with which the seed furrow-opener is pressed to the ground.

It is further desirable to be able to quickly set the drilling depth even for a large machine with a large number of row units.

Furthermore, it is desirable to be able to set the drilling depth while the agricultural implement is operated, for example when sowing is in progress, in order to be able to manage variations in the bearing capacity of the earth across the area where sowing is taking place.

Moreover, it is desirable to be able to set the drilling depth for individual row units or groups of row units.

In addition, it is desirable to be able to control the drilling depth when sowing is in progress so that the drilling depth is substantially constant even when the hardness of the ground varies.

One solution for setting the drilling depth of a row unit is known from DE102007028193A1. However, the row unit disclosed therein takes up a great deal of space, not least in the transverse direction of the agricultural implement. Besides, the solution is very complex and therefore expensive to manufacture and difficult to maintain.

Consequently, there is a need for an improved row unit whose drilling depth can be set during operation of the agricultural implement.

SUMMARY

One object of this document is thus to provide an improved row unit, and in particular a row unit whose drilling depth can be set during operation of the agricultural implement, and which can be manufactured at a lower cost.

A further object is to provide a row unit whose drilling depth can be continuously controlled in relation to the hardness of the ground.

The invention is defined by the attached independent patent claims. Embodiments are set forth in the attached dependent patent claims, in the description that follows and in the accompanying drawings.

According to a first aspect, a row unit for feeding granular material to the ground is provided, comprising a seed furrow-opener, which has a seed furrow-opening arm carrying a seed disc, the seed furrow-opening arm having a proximal portion, in which the seed furrow-opening arm is pivotable about a first geometrical axis and a distal portion, to which the seed disc is rotatably attached, a depth regulator, which has a depth-regulating arm carrying a gauge wheel, is pivotable about a second geometrical axis which is concentric with a centre of rotation for the seed disc. The row unit comprises a first adjusting device for setting the height of the gauge wheel in relation to the seed disc. The first adjusting device comprises a lever and the depth-regulating driver arm, so that the pivotal position of the lever is controllable by pivoting the depth-regulating driver arm.

Primarily, "granular material" means seed. However, the invention can be applied to other forms of granular material that are required to be fed to the ground on which the row unit is travelling, such as fertilizer or pesticides.

The depth-regulating driver arm can be pivotable about the first geometrical axis, or about a geometrical axis located immediately adjacent to the first geometrical axis.

The seed furrow-opening arm, the lever, the depth-regulating driver arm and the control link can thus form a parallel linkage, of which the first and second geometrical axes can be fixed pivot axes.

The control link can thus be pivotally connected to distal portions of the lever and the depth-regulating driver arm.

Since the depth-regulating arm is attached to the distal portion of the seed furrow-opening arm, i.e. near the seed disc, the depth regulator follows the pivoting of the seed furrow-opening arm, for example, if this carries out a resilient motion.

By those means, the position of the lever, and thus the position of the depth-regulating arm is, via the depth-regulating control link, adjustable using the depth-regulating driver arm.

The depth-regulating driver arm can be pivotable about the first geometrical axis.

A geometrical axis of rotation of the gauge wheel can be displaced from a geometrical axis of rotation of the seed disc.

By means of the centre of rotation of the gauge wheel being displaced relative to the centre of rotation of the seed disc, pivoting the depth-regulating arm leads to the height position of the gauge wheel relative to the seed disc being changed.

The row unit can further comprise a pressure device, which has a press wheel arm connected to the seed furrow-opening arm and carrying a press wheel.

The press wheel should be aligned with an orifice of a seed channel so that seed being fed through the orifice is run over by the press wheel.

The press wheel arm can be fixedly or movably connected to the seed furrow-opening arm.

The press wheel arm can be pivotably connected to the seed furrow-opening arm, and the row unit can further be a second adjusting device for setting the working height of the press wheel in relation to the seed disc. The first and second adjusting devices can be joined together so that the second adjusting device follows the first adjusting device.

The second adjusting device can comprise a second synchronization linkage comprising a first pivot axis about which the depth-regulating arm is pivotable, a second pivot axis about which the press wheel arm is pivotable and a linkage arrangement for transmission of pivotal movement between the first and second pivot axes.

The second adjusting device can comprise at least a rear synchronization link, which can be pivotably connected between the press wheel arm and the lever, so that the press wheel arm is pivotable in a synchronized manner with the depth-regulating arm.

The second adjusting device can further comprise a second lever, which is fixedly connected to the lever, wherein the synchronization link is pivotably connected to the second lever at a distal portion of the second lever.

The row unit can further comprise a suspension unit which is active between the press wheel and the seed furrow-opening arm so that the press wheel is pre-tensionable downward.

The row unit can further comprise a seed furrow-sealer, which has a seed furrow-sealing arm connected to the seed furrow-opening arm and which carries a seed furrow-sealing part, such as a seed furrow-sealing wheel.

The seed furrow-sealing arm can be pivotably connected to the seed furrow-opening arm, and the row unit can further comprise a third adjusting device for setting the working height of the seed furrow-sealing part in relation to the seed disc. The first and third adjusting devices can be joined together so that the third adjusting device follows the first adjusting device.

The seed furrow-sealing arm can be pivotably connected to the seed furrow-opening arm. The third adjusting device can comprise at least a rear synchronization link, which can be pivotably connected between the seed furrow-sealing arm and the lever, so that the seed furrow-sealing arm is pivotable in a synchronized manner with the depth-regulating arm.

The row unit can further comprise a second lever, which can be fixedly connected to the lever, wherein the synchronization link is pivotably connected to the second lever at a distal portion of the second lever.

The press wheel arm can be fixedly connected to the seed furrow-sealing arm so that the press wheel arm and the seed furrow-opening arm are pivotable relative to the seed furrow-opening arm about a common axis.

The second and third adjusting devices can be one and the same adjusting device.

The row unit can further comprise a suspension unit which is active between the seed furrow-sealing wheel and the seed furrow-opening arm so that the seed furrow-sealing wheel is pre-tensionable downward.

The seed furrow-sealing wheel can have a geometrical axis of rotation which is non-parallel to a perpendicularly transverse direction to a direction of travel for the row unit, viewed in a horizontal plane, such that the seed furrow-sealing wheel is facing slightly forward to a direction of travel.

The geometrical axis of rotation for the seed furrow-sealing wheel can be non-parallel to the transverse direction of the row unit, viewed in a vertical plane which comprises the transverse direction of the agricultural implement, so that the seed furrow-sealing wheel is facing slightly downward.

The row unit can comprise a single seed furrow-sealer, such as a seed furrow-sealing wheel.

The depth-regulating arm and the lever can be located on axially opposite sides of the seed disc.

The lever and the depth-regulating arm can be fixed to respective end portions of an axis, which is concentric with a seed furrow-opening hub.

The control link can extend substantially along the seed furrow-opening arm.

The depth-regulating arm can be a proximal portion, to which the depth-regulating arm is pivotably attached to the seed furrow-opening arm, wherein the depth-regulating arm can be pivotable about a geometrical axis of rotation of the depth-regulating arm, and wherein the gauge wheel can be rotatably attached to a distal portion of the depth-regulating arm.

One part of an axially distal portion of the gauge wheel can connect to an axially exposed surface of the seed disc.

The row unit can further comprise a seed channel with an orifice located within a periphery of the seed disc, preferably at a lower portion thereof and preferably behind the centre of rotation of the seed disc, viewed in a direction of travel.

The geometrical axis of rotation of the seed disc can be non-parallel to a perpendicularly transverse direction to a direction of travel for the row unit.

The geometrical axis of rotation of the seed disc can be non-parallel to the transverse direction, viewed in a horizontal plane, so that the seed disc is facing slightly away from the direction of travel.

The geometrical axis of rotation for the seed disc can be non-parallel to the transverse direction, viewed in a vertical plane which comprises the transverse direction of the row unit, so that the seed disc is facing slightly upward.

The row unit can comprise a drive unit which is operably connected to the seed disc, and which is set to bring the seed disc into rotation.

The row unit comprises a single seed disc.

According to a second aspect an agricultural implement is provided, comprising an implement frame, which carries a number of row units as described above, a first actuator, for setting a ground pressure effected by the seed discs, and a second actuator, for setting the height position of the gauge wheels relative to the seed discs.

"Implement frame" means an arbitrary frame part which is fixed or fixable in relation to the main frame of the agricultural implement.

The first actuator can be arranged for setting the ground pressure for one or more row units.

The second actuator can be arranged for setting the working depth for one or more row units.

The agricultural implement can further comprise a first pivot axis, which is fixedly connected to a ground pressure operating arm and pivotable about a geometrical axis of rotation, wherein the first actuator is actively arranged between the implement frame and a distal portion of the ground pressure operating arm.

The agricultural implement can further comprise a suspension unit, which is actively arranged between the first pivot axis and the seed furrow-opening arm, so that the seed furrow-opening arm is cushioned relative to the ground pressure operating arm.

The suspension unit can comprise an inner polygonal sleeve, an outer polygonal sleeve and at least one rubber elastic element arranged in a space between the sleeves, wherein the outer sleeve is pivotable in a damped manner relative to the inner sleeve.

The inner sleeve can be fixedly connected to the first pivot axis and the outer sleeve can be fixedly connected to the seed furrow-opening arm.

The ground pressure operating arm can be connected to the respective seed furrow-opening arms of at least two row units, preferably via respective suspension devices.

The agricultural implement can comprise a first row of said row units and, viewed in the direction of travel, a second row of said row units arranged behind the first row, wherein a ground pressure synchronization link is connected to a ground pressure operating arm of the first row and to a ground pressure operating arm of the second row.

The agricultural implement can further comprise a depth-regulating control arm which is connected to the respective depth-regulating driver arms of at least two row units, wherein the second actuator is actively arranged between the implement frame and a distal portion of the depth-regulating control arm.

The depth-regulating control arm and the depth-regulating driver arm can be pivotable about a common geometrical axis.

The depth-regulating control arm can be connected to the depth-regulating driver arm via a driver link arranged at a radial distance from the geometrical axis.

The depth-regulating control arm can be connected to the depth-regulating driver arm via a second pivot axis.

The second pivot axis can comprise a torsion bar.

The first and second pivot axes can be concentrically arranged.

The agricultural implement can comprise a first row of said row units and, viewed in the direction of travel, a second row of said row units arranged behind the first row, wherein a depth-regulating synchronization link is connected to a depth-regulating control arm of the first row and to a depth-regulating control arm of the second row.

The first actuator can be controllable for maintaining a predetermined ground pressure.

The second actuator can be controllable for maintaining a predetermined position.

The agricultural implement can further comprise a pressure sensor, for sensing a pressure in the second actuator and a control unit, which can be arranged to control the first actuator based at least partly on a signal from the pressure sensor.

According to a third aspect, a method of setting the drilling depth of at least two row units in an agricultural implement is provided, wherein each of the row units comprises a seed furrow-opener, which has a seed furrow-opening arm carrying a seed disc, the seed furrow-opening arm having a proximal portion, in which the seed furrow-opening arm is pivotable about a first geometrical axis and a distal portion, to which the seed disc is rotatably attached, a depth regulator, which has a depth-regulating arm carrying a gauge wheel, the depth-regulating arm being pivotable about a second geometrical axis which coincides with a centre of rotation for the seed disc. The method comprises providing a pivoting about a geometrical depth-regulating pivot axis which is common to the row units, and transferring the pivoting to the depth-regulating arm using a first adjusting device.

The method can further comprise transferring the pivoting using a depth-regulating driver arm which is pivotable about the depth-regulating pivot axis, a lever, which is fixedly connected to the depth-regulating arm, and a control link connected by distal portions of the depth-regulating driver arm and lever.

The pivoting of the depth-regulating arm can take place about a geometrical axis which coincides with the geometrical axis of rotation of the seed disc.

The depth-regulating pivot axis can coincide with the first geometrical axis.

The method can further comprise pivoting a press wheel arm pivotably connected to the seed furrow-opening arm which carries a press wheel, wherein the press wheel arm pivots in a synchronized manner with said pivoting of the depth-regulating arm.

The method can further comprise pivoting a seed furrow-sealing arm pivotably connected to the seed furrow-opening arm which carries a seed furrow-sealing wheel, wherein the seed furrow-sealing arm pivots in a synchronized manner with said pivoting of the depth-regulating arm.

The press wheel arm can be pivoted together with the seed furrow-sealing arm.

BRIEF DESCRIPTION OF THE DRAWINGS

FIGS. 12a-12c schematically show a side view of a set of row units according to a further embodiment.

DETAILED DESCRIPTION

Figure 1:
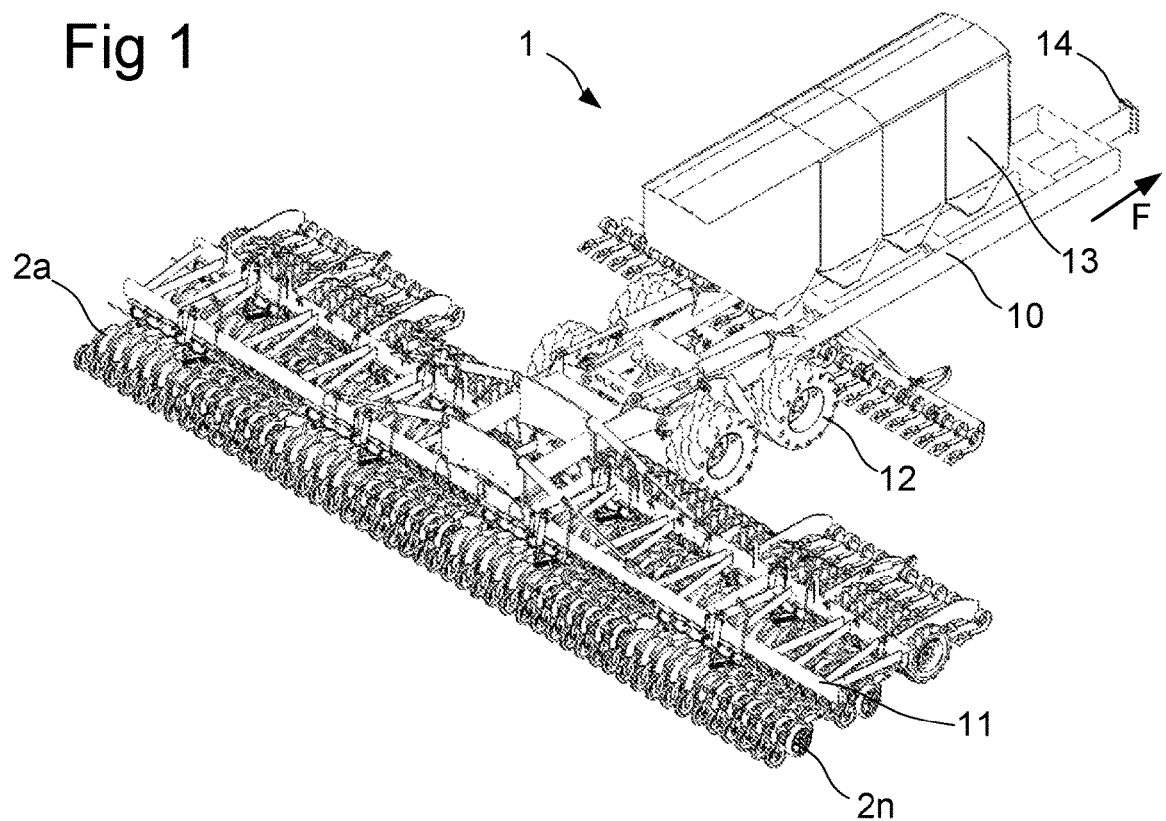
FIG. 1 shows a schematic perspective view of an agricultural implement in the form of a seed drill with a number of row units.

FIG. 1 shows an agricultural implement in the form of a seed drill 1, which comprises a frame, which has at least a longitudinal frame portion 10 and at least a transverse frame portion 11. The seed drill has at least a wheel 12, a seed container 13 and a draw coupling 14, by means of which the agricultural implement can be coupled to a tractor vehicle, such as a tractor, to be drawn in a direction of travel F.

In the example shown, the agricultural implement is formed by a seed drill, and especially a seed drill for volumetric feeding of seed.

The concepts shown herein can also be applied to precision seed drills and to other types of machines for feeding material, especially granular material, to the ground on which the agricultural implement is travelling.

The agricultural implement frame can comprise one or more side portions, which can be foldable between a working mode and a transport mode. For example, the agricultural implement can have two, three, four or five portions which in the working mode are located next to one another, and each can carry a number of ground-engaging tools, such as row units, but also furrow openers, fertilizer openers, levelling tools, flattening tools, cultivator tines, etc.

Such side portions can be foldable about one or more axes which are substantially parallel to the direction of travel and preferably horizontal.

Furthermore, the agricultural implement frame can comprise one or more front portions and/or rear portions pivotable or foldable in relation to a centre portion. For example, a front portion can comprise levelling tools and a rear portion can comprise compacting tools, such as any form of packer.

For agricultural implements with two or more side portions, each side portion can have a front portion and/or a rear portion which can be foldable with the respective side portions.

The agricultural implement shown in FIG. 1 has a large number of row units 2a-2n, which are arranged along two separated rows in the direction of travel F. The row units in a front row can be laterally displaced relative to the row units in a row positioned behind, such that a greater row density can be provided than what would be allowed by the width of the row units if all row units were located on the same row. The displacement can be in the region of 40-60% of a distance between two adjacent row units in any of the rows.

Figure 2:
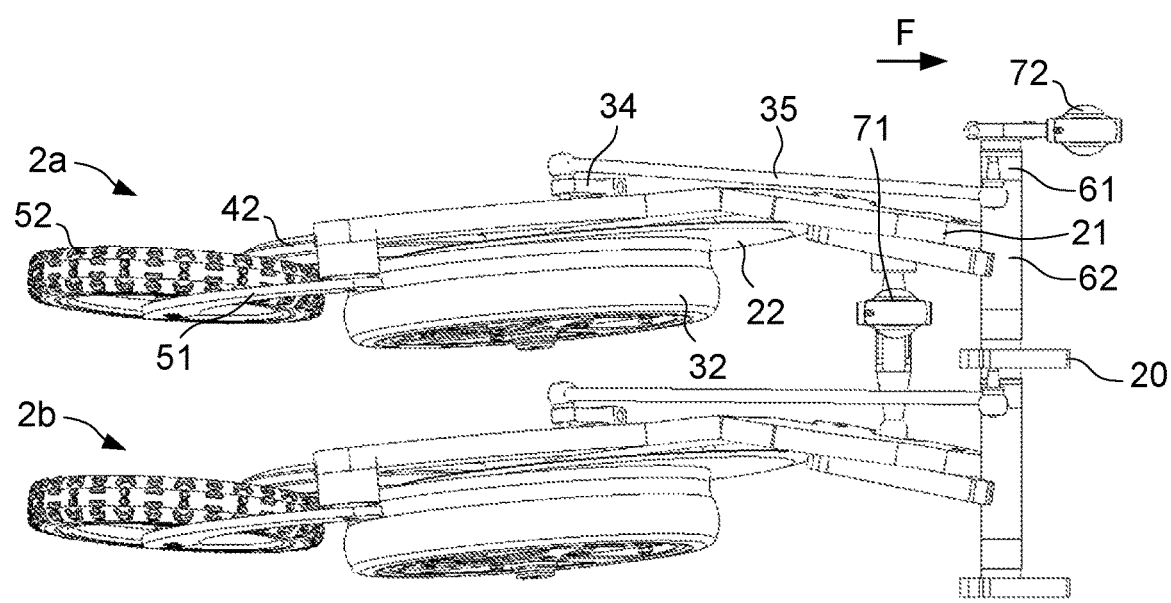
FIG. 2 shows, in schematic plan view from above, a pair of adjacent row units.

FIG. 2 shows, viewed from above, a pair of row units 2a, 2b which are connected via a common control arrangement, comprising first and second pivot axes 61, 62, where the first pivot axis 61 controls the ground pressure of the row units and the second pivot axis 62 controls the drilling depth of the row units.

It will be appreciated that more than two row units can be connected to the same control arrangement. Furthermore, it will be appreciated that row units can be arranged in groups, with more groups within one and the same frame portion, or with a group for each frame portion, so that row units are controllable in groups.

It is also possible to use one of the arrangements shown herein to control each row unit individually.

Each of the row units 2a, 2b comprises a row unit frame 20, which is mountable to a frame of the agricultural implement, in particular to a transverse frame portion 11 which can be formed by a beam with preferably substantially a polygonal cross section, in particular substantially a square cross section.

Each of the row units 2a, 2b further comprises a seed furrow-opening arm 21, which carries a seed disc 22 and a gauge wheel 32, and which is movable relative to the row unit frame 20.

The seed furrow-opening arm 21 can have a form which, viewed in a horizontal plane, is slightly curved so that attachments for the axis of rotation Rs of the seed disc is given a desired orientation in relation to the direction of travel F.

For example, the seed furrow-opening arm can be formed from a substantially plane blank, such as a piece of sheet metal, with a thickness in the range of 8-30 mm, preferably 10-20 mm. The plane blank can be bent or twisted so that the seed furrow-opening arm has at least two plane portions that are separated by a fold, so that an angle between the surface normals of the plane portions is 1-30 degrees, preferably 1-20 degrees or 1-15 degrees.

For example, it is desirable to orientate the axis of rotation of the seed disc, so that this extends slightly rearward, for example 1-30 degrees, preferably 1-20 degrees or 1-15 degrees, relative to a transverse direction which is perpendicular to the direction of travel F.

Furthermore, the axis of rotation Rs of the seed disc gives an orientation so that this extends slightly downward or slightly upward in relation to a horizontal plane.

For example, the axis of rotation extends +/−1-30 degrees relative to a horizontal plane.

The seed furrow-opening arm 21 is connected to a first pivot axis 61 so that the pivotal position of the first pivot axis controls the pivotal position of the seed furrow-opening arms, possibly via a cushioning device, so that the seed furrow-opening arms can individually be cushioned relative to the first pivot axis 61. By those means, a torque applied to the first pivot axis 61 will provide the ground pressure to the row unit 2.

A first actuator 71 can be arranged for setting the pivotal position of the first pivot axis 61. This can be provided by means of the actuator engaging with the seed furrow-opening arm 21 at a distance from the pivot axis 61. Specifically, a ground pressure operating arm 611 can be provided, which can, but does not have to, be separate from the seed furrow-opening arm.

As is shown in FIG. 2, the actuator can engage with a bridge, which at a distance from the pivot axis 61 connects two or more seed furrow-opening arms 21, so that the actuator can control the ground pressure of said two or more seed furrow-opening arms.

The actuator can engage with the seed furrow-opening arm 21 or the bridge via any form of the resilient element. Alternatively, the actuator 71 can comprise spring elements.

The gauge wheel 32 can overlap the seed disc 22. An axially exposed peripheral portion of the gauge wheel can abut an axially exposed portion of the seed disc.

The gauge wheel 32 has an axis of rotation Rd which is displaced in at least a horizontal direction from the axis of rotation Rs of the seed disc 22. The displacement can be approximately 15-45% of a maximum radius of the gauge wheel, preferably approximately 20-40%.

The row unit can have a seed channel 25 which can be connected to a feeder or distributor for feeding of seed to the row unit. The seed channel 25 can have an orifice located inside a periphery of the seed disc 22.

The gauge wheel 32 is arranged at a distal portion of a depth-regulating arm 31, which, at a proximal portion thereof, is pivotably attached to the seed furrow-opening arm 21.

A lever 34 is connected to the depth-regulating arm 31 so that the pivotal position of the lever controls the pivotal position of the depth-regulating arm 31, and thus the height position of the gauge wheel relative to the seed disc 22.

A depth-regulating control link 35 connects a distal portion of the lever 34 with a distal portion of a depth-regulating driver 36, which is fixedly connected to, and is pivotable with, a second pivot axis 62.

A second actuator 72 can be arranged to set the pivotal position of the second pivot axis 62, for example, by means of the actuator engaging with a depth-regulating control lever 38, which is fixedly connected, and pivotable, with the second pivot axis 62.

The row unit can, but does not have to, comprise a press wheel arm 41, which can carry a press wheel 42, or another flattening device, which can be aligned with the orifice 26 of the seed channel, viewed in the transverse direction, so that seed which has been fed to the ground is run over and pressed by the press wheel 42.

The press wheel arm 41 can be mounted to the seed furrow-opening arm 21 or formed in one piece with the seed furrow-opening arm 21, and extends rearward from a rear portion of the seed furrow-opening arm 21.

The press wheel arm 41 can be formed so that the press wheel 42 has an axis of rotation which is substantially horizontal and perpendicular to the direction of travel F.

The row unit can, but does not have to, comprise a seed furrow-sealing arm 51, which can carry a seed furrow-sealing wheel 52 or another scraping or levelling device.

The seed furrow-sealing arm 51 can be formed so that the axis of rotation of the seed furrow-sealing wheel 52 gets an orientation so that this extends slightly forward, for example 1-30 degrees, preferably 1-20 degrees or 1-15 degrees, relative to a transverse direction which is perpendicular to the direction of travel F.

Furthermore, the axis of rotation of the seed furrow-sealing wheel 52 can give an orientation so that this extends slightly downward in relation to a horizontal plane.

For example, the axis of rotation can extend 1-30 degrees, preferably 1-20 degrees or 1-15 degrees, downward in relation to the horizontal plane.

The seed furrow-sealing arm 51 can be mounted to the seed furrow-opening arm 21, to the press wheel arm 41, or be formed in one piece with the seed furrow-opening arm 21 and/or the press wheel arm 41, and extends rearward from a rear portion of the seed furrow-opening arm 21.

Figure 3A:
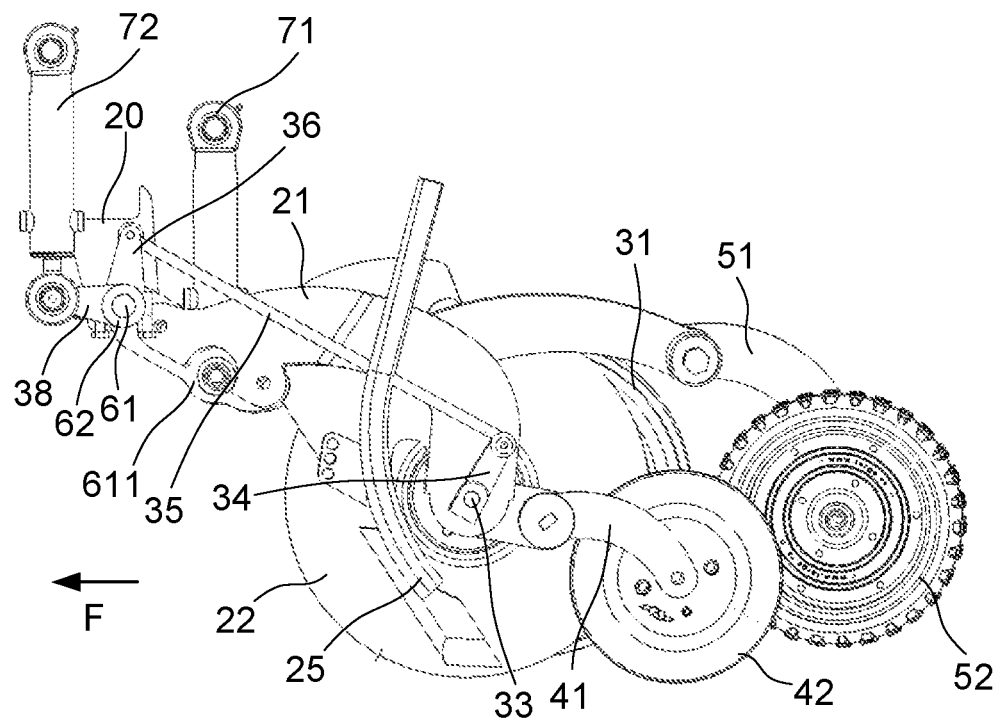
FIGS. 3a-3b show, in schematic plan view from the side, a row unit, viewed from left and right.

FIG. 3*a* shows one of the row units in FIG. 2 viewed from the left side in the direction of travel F.

The actuators 71, 72 act in-between with a frame portion of the agricultural implement and the levers 611 and 38.

FIG. 3*a* shows the axis 33 connecting the depth-regulating arm 31 to the lever 34, the depth-regulating control link 35 which extends between the distal portion of the lever 34 and the distal portion of the driver 36, and the second pivot axis 62, which is fixedly connected to the driver 36.

The depth-regulating control link 35 is pivotably connected to the lever 34 and the driver 36, so that a polygon is formed between the pivot axes Rs/Ra, 62 and the attachments of the depth-regulating control link 35 to the lever 34 and the driver 36 respectively.

Figure 3B:
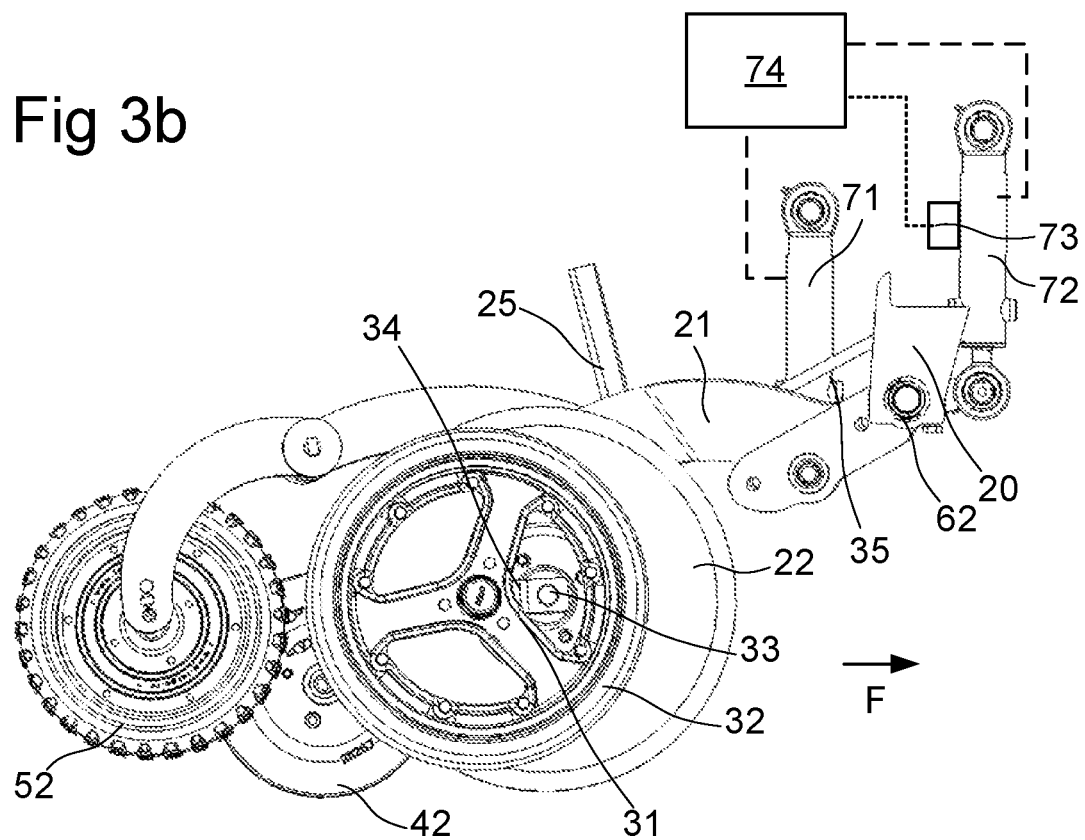

FIG. 3*b* shows the row unit in FIGS. 2 and 3*a* viewed from the right side in the direction of travel F.

FIG. 3*b* also shows how the second actuator 72 is provided with a sensor 73 for sensing pressure in the second actuator 72. The sensor 73 is connected to a control unit 74 which can be set to control the first actuator 71 as well as the second actuator 72.

For example, the control unit can read a pressure which exists in the actuator 72 in a position when the agricultural implement is lowered and the ground pressure applied to the seed furrow-openers and the depth regulators is set to provide the correct drilling depth. This read pressure can form a setpoint.

During travel, the control unit can continuously or intermittently read the pressure in the actuator 72.

The upward and downward thresholds can be assigned, wherein no adjustment of the ground pressure is made as long as the pressure is within the thresholds.

The ground pressure can for example be increased if the pressure in the actuator 72 falls below a lower threshold, which indicates the pressure on the gauge wheel being too low and thus that the seed disc runs too shallow.

The ground pressure can be lowered if the pressure in the actuator exceeds an upper threshold, which indicates the pressure on the gauge wheel being too high and thus that the seed disc runs too deep.

The first actuator 71 is preferably controlled to a desired pressure, which together with at least one part of the weight of the row unit gives rise to a ground pressure.

The second actuator 72 is preferably controlled to the desired position, which corresponds to a desired vertical difference in level between the lower edge of the seed disc 22 and the lower edge of the gauge wheel 32, i.e. a desired drilling depth.

The control of the second actuator 72 to the desired position can be provided by means of the actuator 72, or its feeding channels is provided with valves, which can be controllable, so that they can block the feeding when a certain amount of liquid is fed, or when a certain position is reached.

FIG. 3*b* also shows a part of the depth-regulating arm 31 and the axis 33, about which the depth-regulating arm 31 is pivotable.

Figure 4:
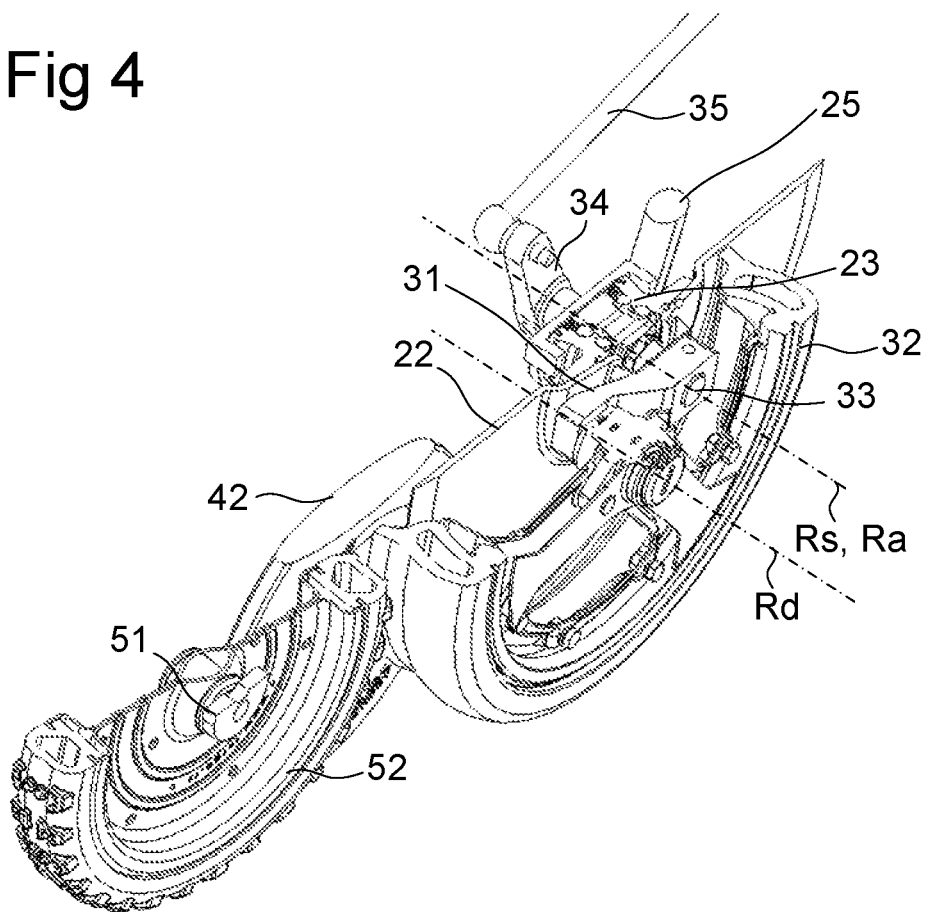
FIG. 4 shows a schematic perspective view of a row unit with parts cut away.

FIG. 4 shows the row unit 2 in perspective obliquely rearward, with parts cut away, so that the depth-regulating arm 31, the axis 33 and the lever 34 are fully visible.

In FIG. 4 it can be seen that the axis 33 runs through a centre of rotation of the seed disc 22 so that the axis of rotation Ra of the depth-regulating arm coincides with the axis of rotation Rs of the seed disc.

For this purpose, the hub 23 of the seed disc has a through-hole for the axis 33, which can also be mounted, such as with roller bearings (not shown), in the hub 23.

In FIG. 4 it can also be seen how the axis of rotation Rd of the gauge wheel 32 is displaced relative to the axis of rotation Rs of the seed disc.

Figure 5:
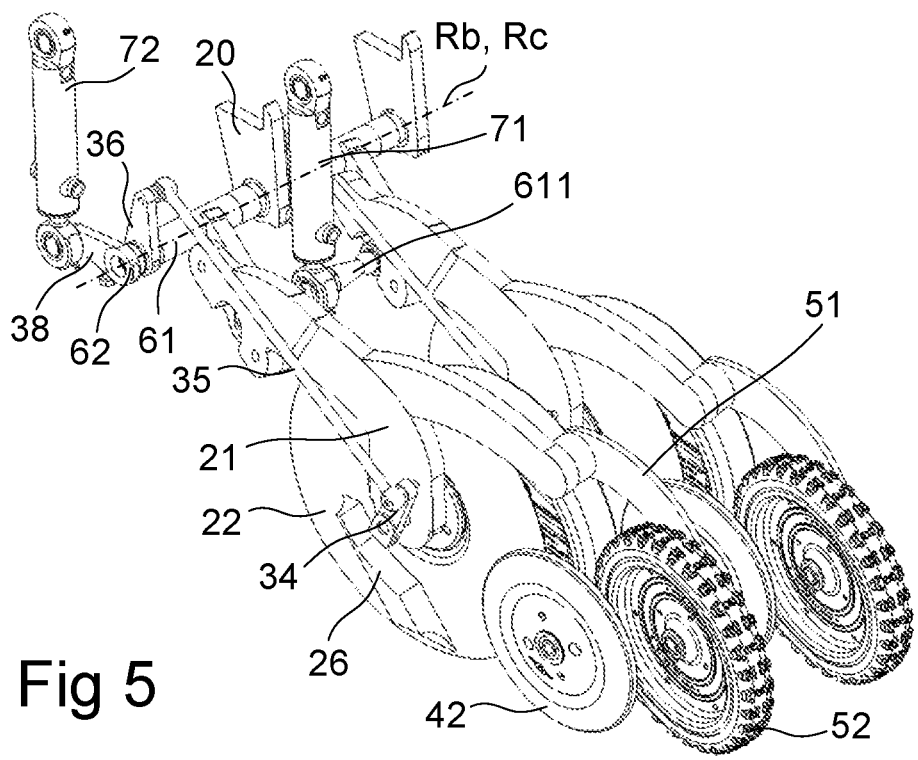
FIG. 5 shows a schematic perspective view of two adjacent row units.

FIG. 5 shows the row units in FIG. 2 viewed obliquely rearward.

In FIG. 5 it can be seen how the axis of rotation Rb of the seed furrow-opening arms which are provided by the first pivot axis 61 coincides with the axis of rotation Rc of the depth-regulating control lever 38 which is provided by the second pivot axis 62.

Figure 6:
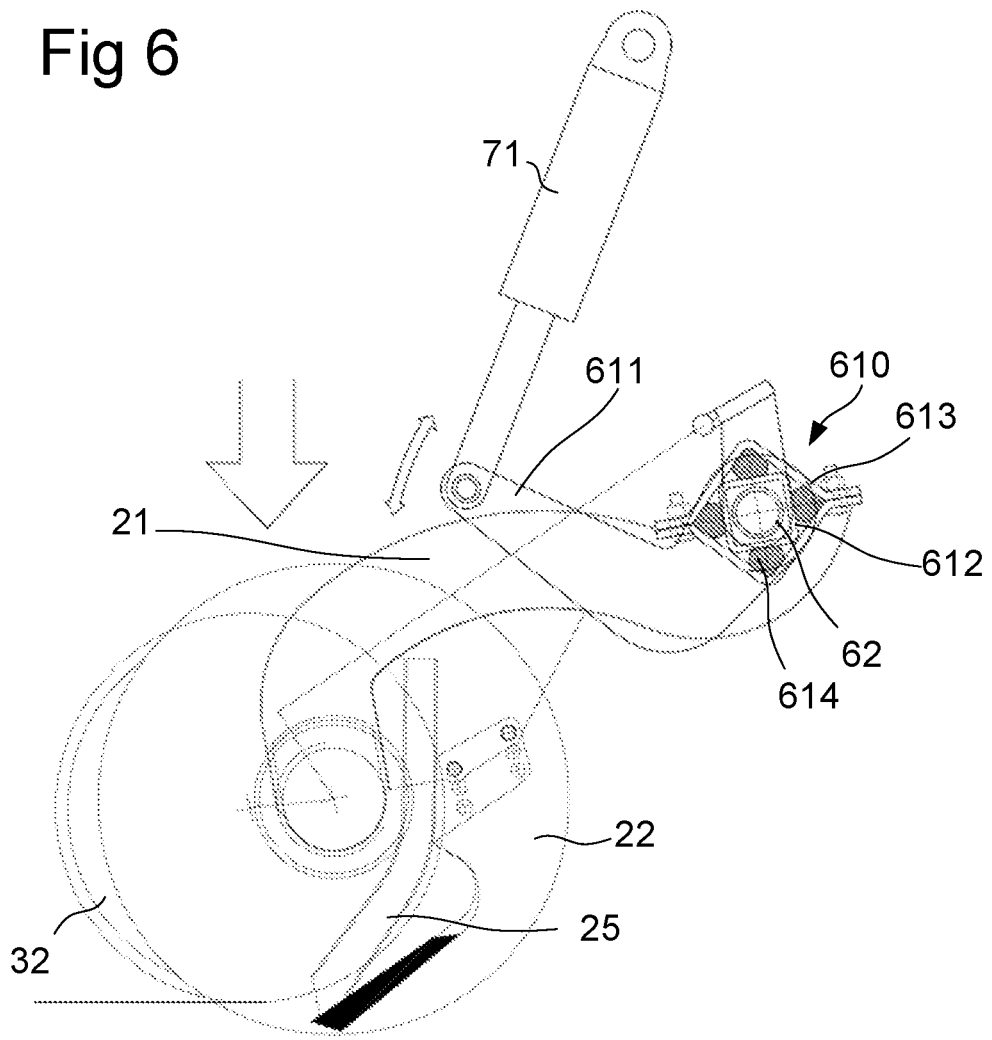
FIG. 6 shows a schematic side view of a row unit according to an alternative embodiment.
Figure 7:
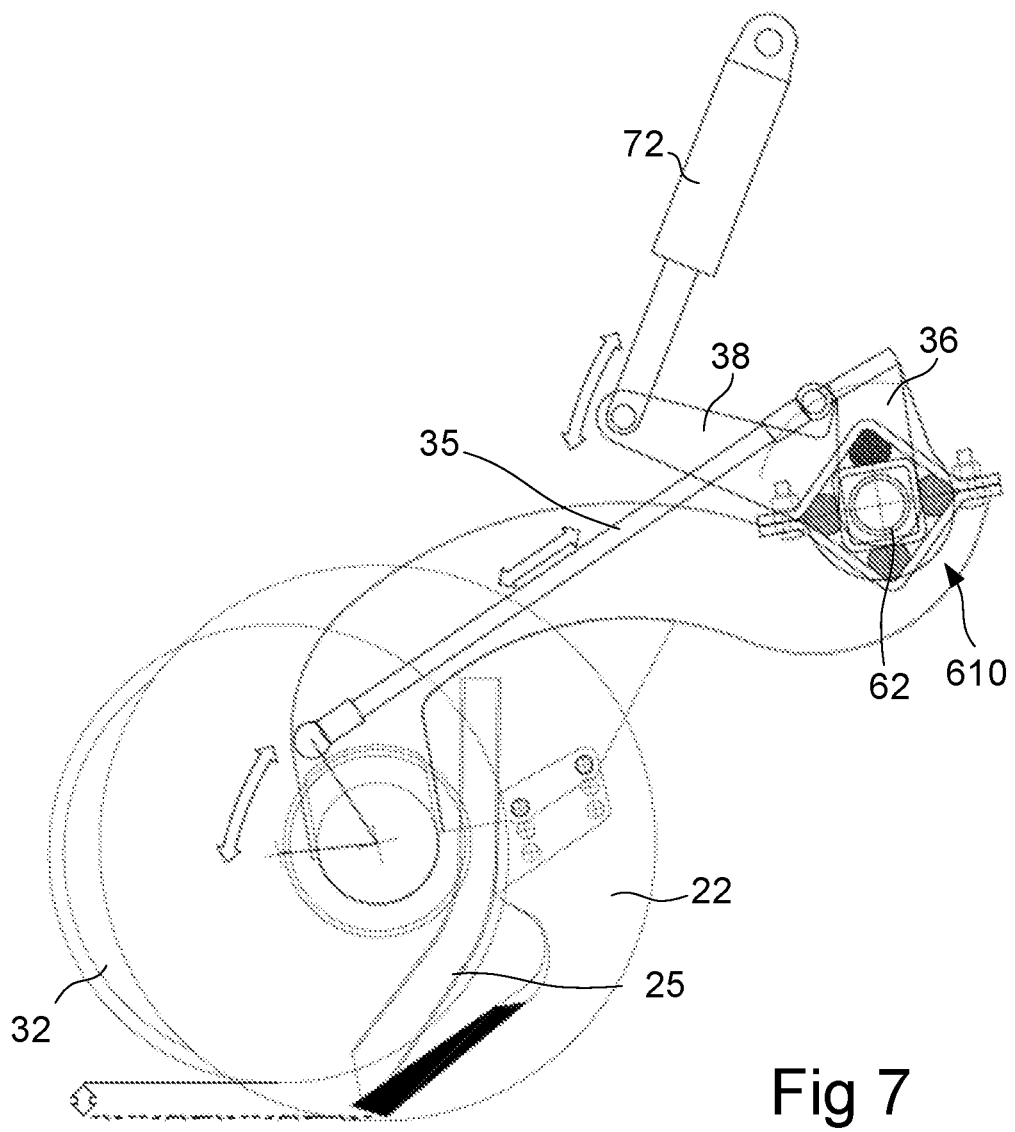
FIG. 7 shows a schematic side view of the row unit according to the alternative embodiment.

FIGS. 6-7 show a row unit according to a second embodiment. This embodiment coincides in large parts with the first embodiment, which is why the description that follows concentrates on the differences between the first and the second embodiments.

In the second embodiment the first pivot axis 61 is provided by a square tube 612 with substantially square cross section, which is connected to a ground pressure operating arm 611, with the distal portion of which the first actuator 71 is active and pivotably connected.

The seed furrow-opening arm 21 is attached to a square tube 612 surrounding casing 613, which also has a substantially square cross section, but which is turned 45 degrees in relation to the square tube 612.

In the substantially triangular spaces formed between the square tube 612 and the casing 613, rubber elastic elements 614 are arranged, for forming a suspension device 610.

The suspension device can be formed according to any of the disclosures in WO2014/051507A1, GB652266 or EP1541003A1.

By means of this arrangement the first actuator 71 acts substantially unsprung on the ground pressure operating arm 611 and the first pivot axis 61. When a number of row units are connected to the first pivot axis 61, each seed furrow-opening arm 21 can be resiliently attached relative to the first pivot axis 61, via such a respective spring arrangement, so that one and the same pressure can be applied to the row units at the same time as the row units can spring individually, for example when colliding with an obstacle, such as stones, or in order to compensate for unevenness or variations in the hardness of the ground.

FIG. 7 shows how the depth-regulating control lever 38 is connected to the second pivot axis 62 which is here arranged as an axis with a circular cross section, which runs within the square tube 612.

Moreover, FIG. 7 shows how the driver lever 36 is connected to the second pivot axis 62.

The second axis 62 can be formed as a torsion strut, i.e. with a certain ability to spring about its axial direction.

For example, a second pivot axis 62 can have a number of driver levers 36, arranged at a distance from each other and one, or only a few, depth-regulating control levers 38 and with this interacting second actuator 72 as described above.

At each driver 36 the square tube 612 can have an opening, so that the driver 36 can extend through the square tube and move in relation to the square tube.

As a result, the second pivot axis 62 can control the depth setting for a number of row units.

Figure 8A:
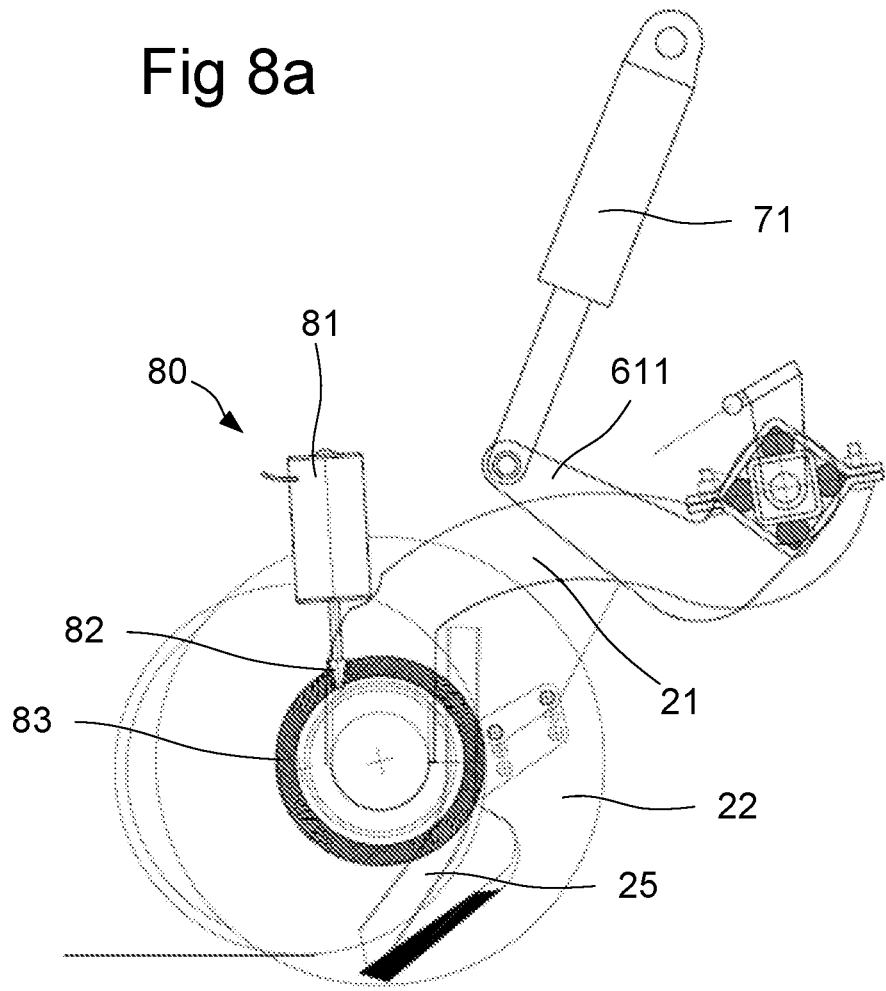
FIGS. 8a-8b schematically show a row unit according to a further alternative embodiment.
Figure 8B:
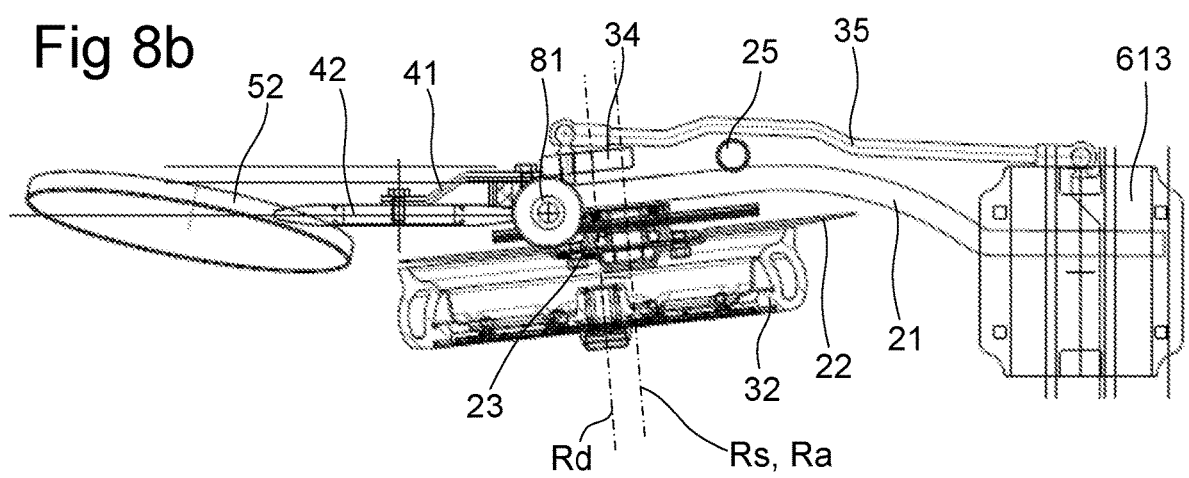

FIGS. 8a-8b show how the embodiments of the row units discussed above can be provided with a drive device 80 for driving the seed disc 22. For example, each row unit 2 can be provided with a drive motor 81, such as an electric motor or a hydraulic motor, and, via a drive shaft provided with gearwheels 82, engage with a gear disc 83 connected to the seed disc.

The motor 81 can be controlled by a control unit 84, which can be integrated with the control unit 74 and/or with a control unit which controls the entire agricultural implement, or simply with a control unit which is arranged in the tractor vehicle and which controls the entire unit.

The motor can be driven at a speed which exceeds the "normal" speed that the seed disc could attain if it were allowed to rotate freely during travel. For example, the seed disc can be controlled to a speed which is 20-150% higher than the normal speed, preferably 50-100% higher.

Figure 9:
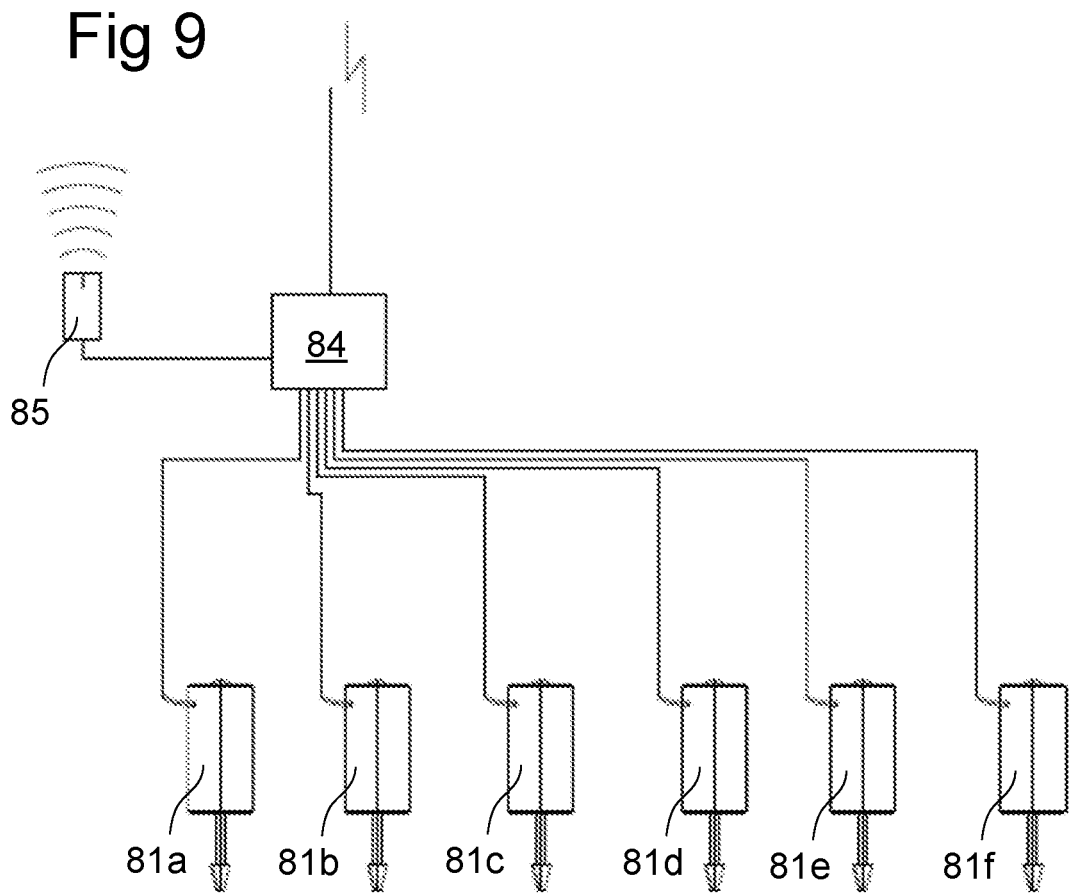
FIG. 9 schematically shows a control device for a set of row units according to FIGS. 8a-8b.

FIG. 9 shows how an agricultural implement can be provided with a motor 81a-81f for each seed disc. Furthermore, FIG. 9 shows how a speed sensor 85, such as a ground radar, a GPS sensor or other type of sensor, can be connected to the motor control unit 84, for providing a reference speed.

As a further alternative, speed data can be collected from a measuring instrument of the tractor vehicle.

Figure 10:
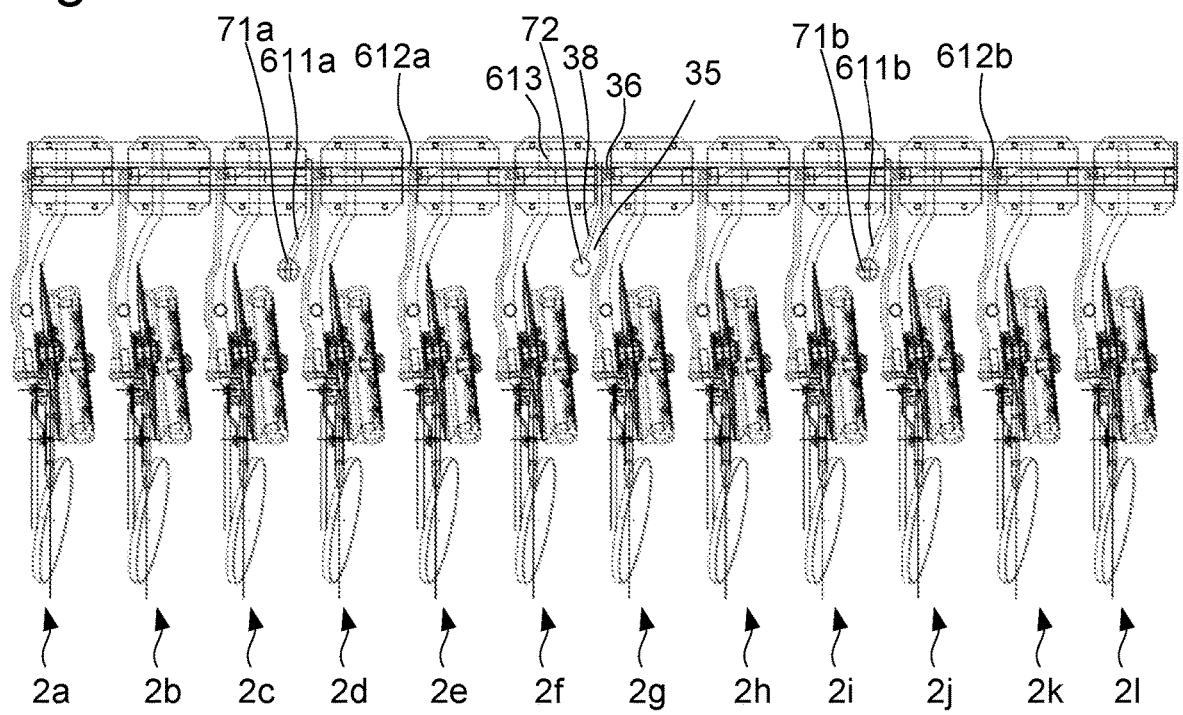
FIG. 10 schematically shows a top view of a set of row units, which each can be according to any of the abovementioned embodiments.

FIG. 10 shows two sets of row units, where a first set comprises the row units 2a-2f and a second set comprises the row units 2g-2l. Furthermore, FIG. 10 shows how the first and second sets have a respective first actuator 71a, 71b for setting the ground pressure, and how they have a common second actuator 72 for setting the drilling depth.

This is provided through the first set of row units 2a-2f being connected by a first square beam 612a and the second set of row units 2g-2l being connected by a second square beam 612b.

The first actuator 71a of the first set of row units 2a-2f engages with a first ground pressure operating arm 611a, which is fixedly connected, and pivotable, with the first square beam 612a.

The first actuator 71b of the second set of row units 2g-2l engages with a first ground pressure operating arm 611b, which is fixedly connected, and pivotable, with the first square beam 612b.

Each row unit 2a-2l is connected to a respective casing 613, such as is shown with reference to FIGS. 6-7.

Furthermore, both sets have a common second pivot axis 62, which runs through both square beams 612a, 612b.

Figure 11A:
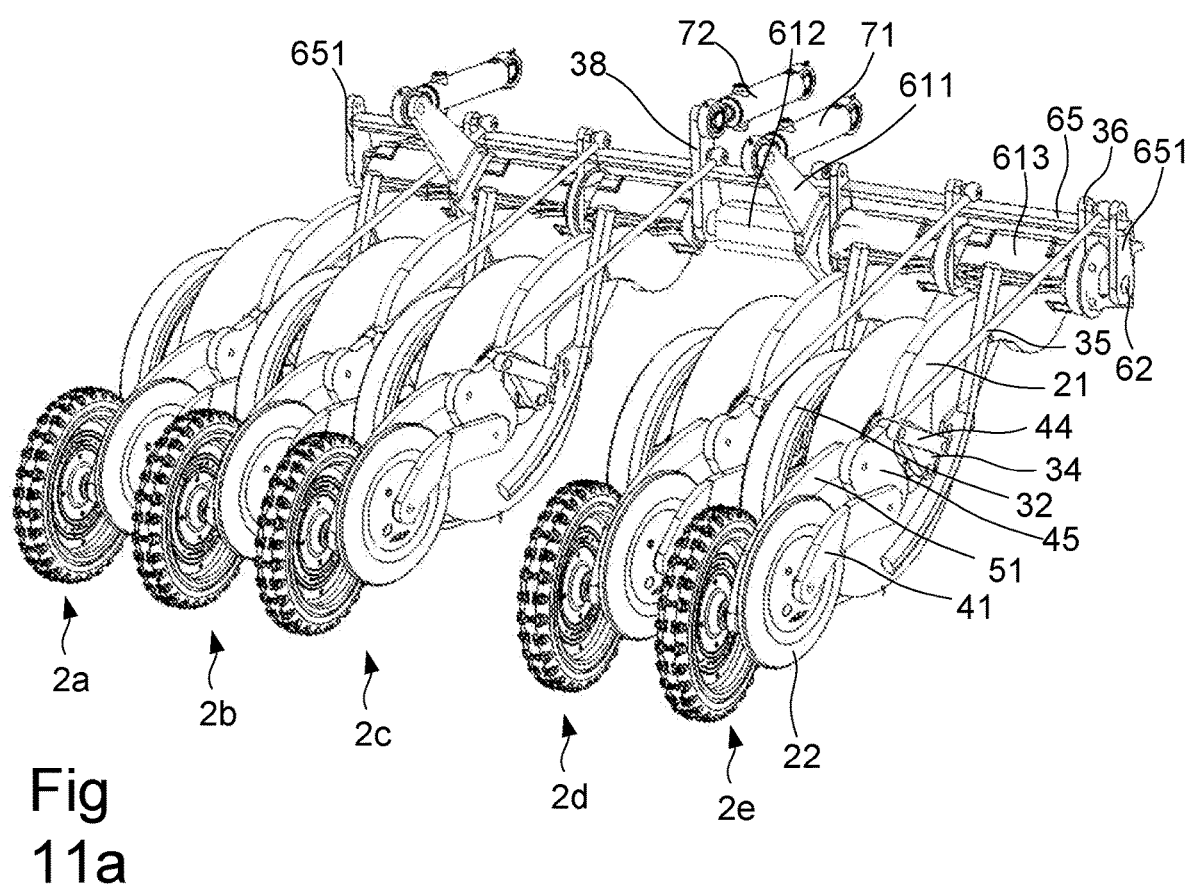
FIGS. 11a-11c schematically show a set of row units according to a further embodiment.
Figure 11B:
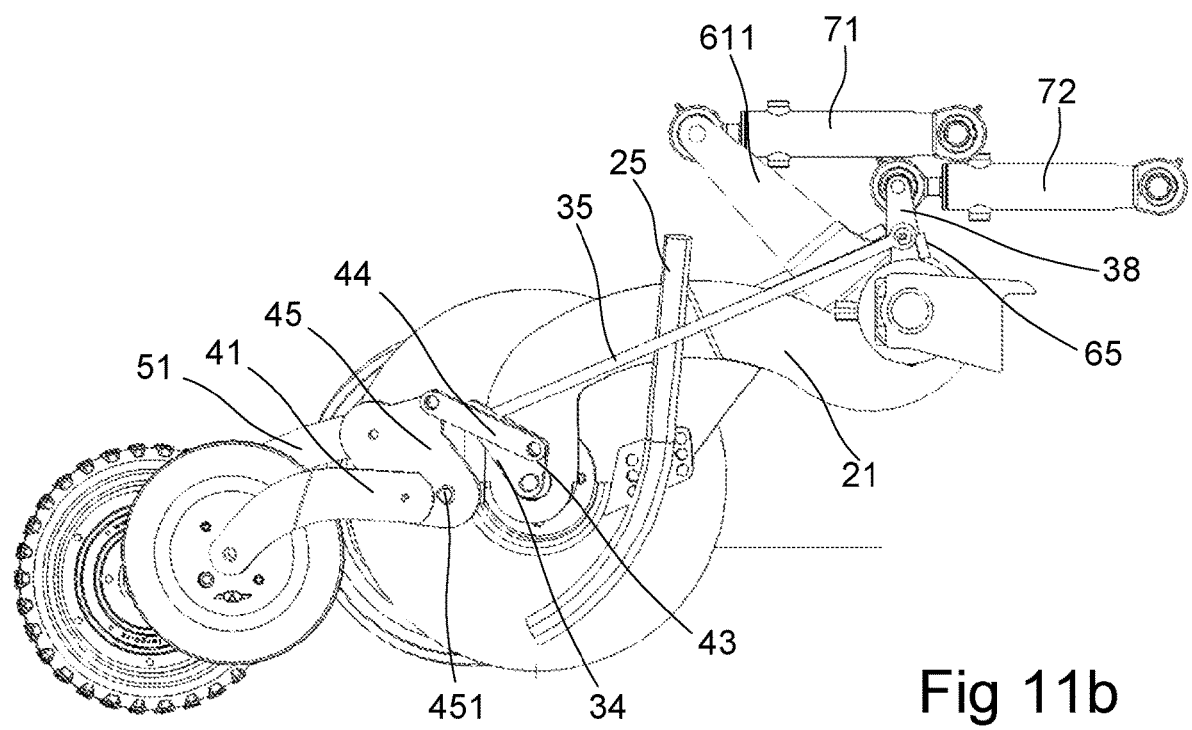
Figure 11C:
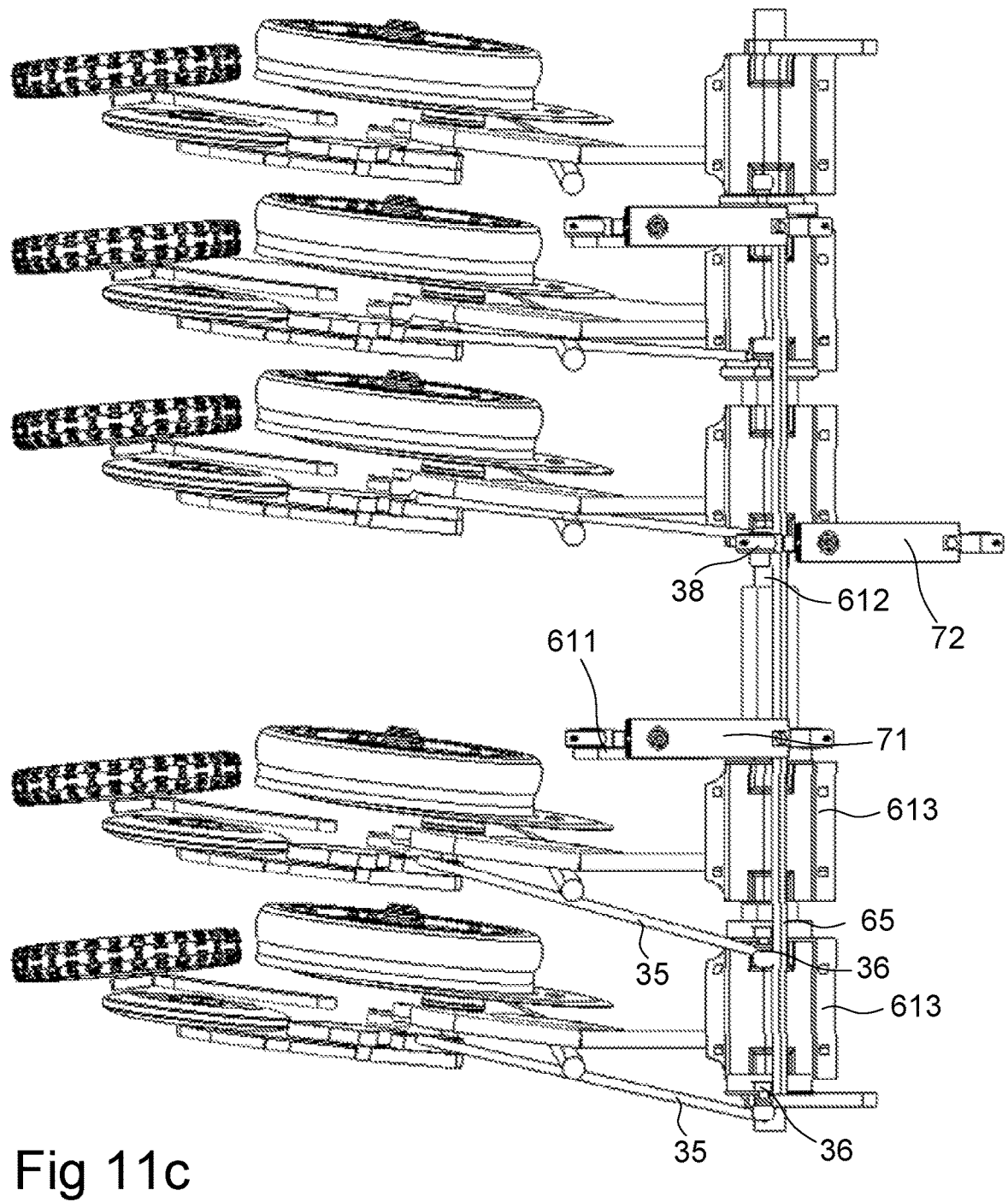

FIGS. 11a-11c show a further embodiment of a set of row units, where each of the row units 2a-2e, as the mechanism for setting the ground pressure using the first actuator 71, has the same function as described above, but where the mechanism for transferring the movement from the second actuator 72 to the depth-regulating driver arms 36 is modified.

The axis 62 in FIGS. 11a-11c is a fixed axis, about which the square tube 612 is pivotably arranged.

The depth-regulating driver arms 36 are mounted relative to the square tube 612, so that they are pivotable independently of the square tube 612. The depth-regulating control lever 38 is pivotably arranged on the axis 62 and connected to the depth-regulating driver arms 36 via a driver link 65 extending along the axis 62 which is fixedly connected relative to each of the depth-regulating driver arms 36 which is controlled by one and the same second actuator 72.

The driver link 65 can also be a part which extends along the axis 62 and at a radial distance from this. In this embodiment, the depth-regulating driver arms 36 are also mounted, and thus pivotable, relative to the axis 62. By means of operating the second actuator 72, so that this pivots the depth-regulating control lever 38, the driver link 65 transfers the equivalent pivotal movement to each of the depth-regulating driver arms 36 connected to this.

Alternatively, as shown in FIG. 11a, the depth-regulating driver arms 36 can be fixedly connected to the axis 62 and also non-pivotable in relation to this. Further stabilizing depth-regulating driver arms 651 can be arranged at at least one end portion of the second axis 62.

FIGS. 11a and 11b show a complementary arrangement for controlling at least one of the press wheel 42 or the seed furrow-sealing wheel 52, to ensure that these operate at the correct depth.

In the embodiment shown a link part 45 is pivotably attached to a distal portion of the seed furrow-opening arm 21, so that the link part 45 is pivotable about an axis 451.

At least one of the press wheel arm 41 or the seed furrow-sealing arm 51 is fixedly connected to the link part 45, so that the press wheel arm 41 and/or seed furrow-sealing arm 51 is pivotable with the link part about the axis 451.

A rear synchronization link 44 at a distance from the axis 451 is pivotably connected to the link part 45 so that displacement of the rear synchronization link 44 causes pivoting of the link part 45 about the axis 451. The rear synchronization link 44 can be pivotably connected to a second lever 43, which can be pivotable about the same pivot axis 33, Ra as the first lever 34 is pivotable about.

In the embodiment shown in FIGS. 11a-11b, the second lever 43 is integrated with the first lever 34, as much as they are formed in a piece of material, wherein the link 35 and the rear synchronization link 44 are pivotably connected to the piece of material forming the levers 34, 43 so that they engage with different portions of the piece of material.

By means of the arrangement shown in FIGS. 11a-11b, the working height of the press wheel and/or the seed furrow-sealer can be set in a desired manner.

Specifically, the working height of the press wheel and/or the seed furrow-sealer can be set in a predetermined relationship to the working height of the gauge wheel, and using the same mechanism.

For example, it can be desirable that the press wheel operates at substantially the same depth as the seed furrow-opener, for example, so that the lower edge of the press wheel is in the same horizontal plane as, and preferably in line with, the lower edge of the seed furrow-opener.

Furthermore, it can be desirable that the seed furrow-sealer operates at a certain predetermined height in relation to the height position of the gauge wheel 32 and/or the press wheel 42, to seal the seed furrow.

The seed furrow-sealing arm can also be spring-loaded, so that it is pre-tensioned to the ground surface in working mode.

Figure 12C:
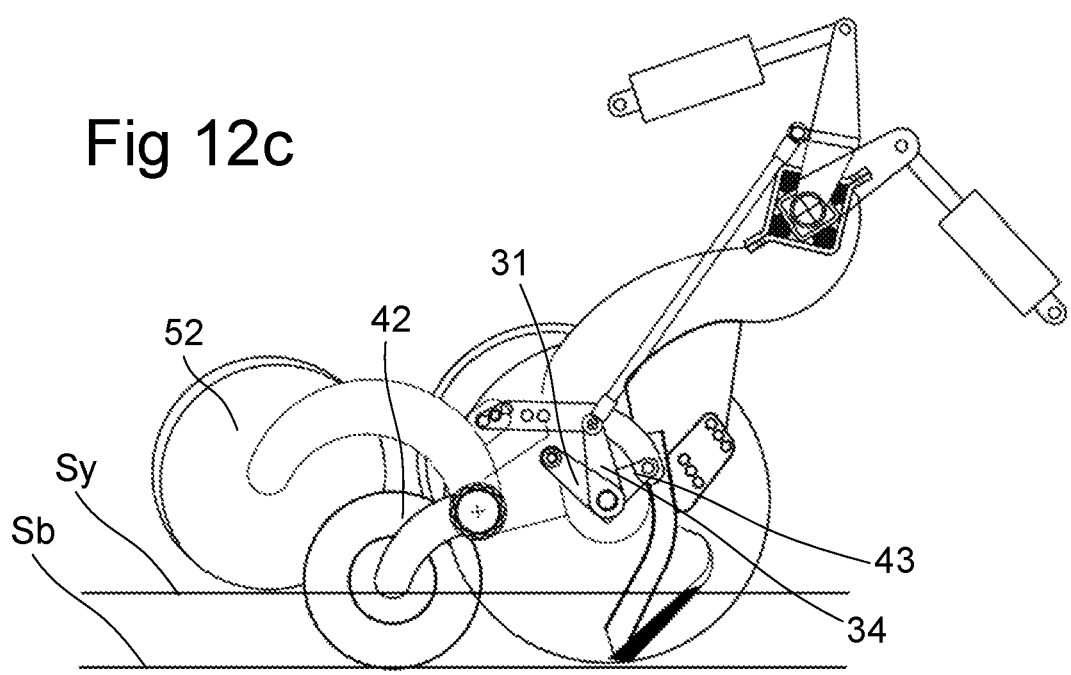

FIGS. 12a-12c show a further arrangement for controlling the working height of the press wheel 42 and/or the seed furrow-sealing wheel 52.

In the arrangement shown in FIGS. 12a-12c, a proximal portion of the press wheel arm 41 and a proximal portion of the seed furrow-sealing arm 51 are connected at a distal and/or rear portion of the seed furrow-opening arm 21.

In the example shown, the press wheel arm 41 and the seed furrow-sealing arm 51 are fixedly connected to each other, so that they are jointly pivotable in relation to the seed furrow-opening arm 21 about the axis 451.

Furthermore, a rear synchronization link 44 can be pivotably connected to one of the press wheel arm 41 or the seed furrow-sealing arm 51. As is shown in FIG. 12a, the synchronization link 44 is connected via a material tongue 511 on the seed furrow-sealing arm 51.

The rear synchronization link 44 further connects to a lever 43, which is fixedly connected to the depth-regulating arm 31 and the lever 34 and is pivotable about the axis 33, Ra. In the embodiment shown in FIGS. 12a-12c the lever 43 can be a separate part. Alternatively, the lever 43 can be connected to the lever 34 and is possibly formed in one piece with the lever 34.

In the arrangement shown in FIGS. 12a-12c, a parallelogram with corners is formed at the axis 33, Ra, at the axis 451, at the coupling between the lever 34 and the rear synchronization link 44 and at the coupling 511 between the rear synchronization link 44 and the seed furrow-sealing arm 51.

By selecting the positioning of the corners and the lengths of the various arms and links, for example with the conditions shown in FIGS. 12a-12c, it is possible to ensure a geometry where the lower edge of the press wheel 42 is substantially in the same horizontal plane as the lower edge of the seed disc 22, and where the lower edge of the gauge wheel 32 is substantially in the same horizontal plane as the lower edge of the seed furrow-sealing wheel 52. Preferably, the seed furrow-sealing wheel 52 can be set so that its lower edge is in a lower horizontal plane than the lower edge of the gauge wheel, especially if the seed furrow-sealing wheel 52 is arranged on an arm 51 which enables a spring for pre-tensioning of the seed furrow-sealing wheel 52 to the ground surface.

FIGS. 12b and 12c show how the lower edges of the seed disc 22 and the pressure wheel 42 are substantially in the same horizontal plane, so that both are working at a seed furrow bottom Sb. The seed furrow-sealing wheel 42 is working at a height Sy which corresponds to the desired position of the surface of the earth.

Figure 13:
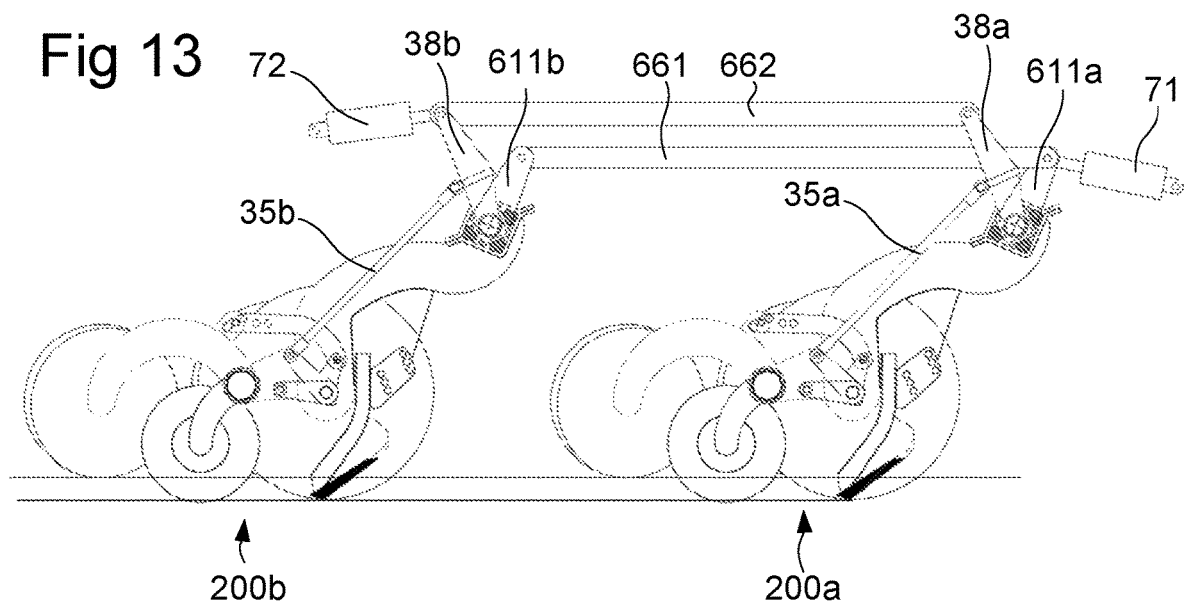
FIG. 13 shows a schematic perspective view of two rows with row units.

FIG. 13 shows how two rows 200a, 200b of row units can be jointly controlled. Each row comprises a number of row units, which can be of one and the same type.

The row units shown in FIG. 13 are of the type which is shown with reference to FIGS. 12a-12c. It will be appreciated that the concept shown in FIG. 13 can be applied to all variants and embodiments of row units shown herein.

FIG. 13 shows how a first actuator 71 for setting the ground pressure according to the description above is connected to a first ground pressure operating arm 611a of a first row 200a of the row units. A ground synchronization link 661 connects at least one such ground pressure operating arm 611a to a ground pressure operating arm 611b of a second row 200b of the row units, so that movement of the first ground pressure operating arm 611a is transferred to the second ground pressure operating arm 611b, so that the pivotal movements of the first pivot axes 61 of the rows 200a, 200b are synchronized and thus provide substantially the same ground pressure to both rows 200a, 200b.

FIG. 13 also shows how a second actuator 72 for setting the drilling depth according to the description above is connected to a second depth-regulating control arm 38b of the second row 200b of the row units. A depth-regulating synchronization link 662 connects at least one such depth-regulating control arm 38b to a depth-regulating control arm 38a of the first row 200b of the row units, so that movement of the second depth-regulating control arm 38b is transferred to the first depth-regulating control arm 38a, so that the pivotal movements of the second pivot axes 62 of the rows 200a, 200b are synchronized and thus provide substantially the same depth-regulating setting to both rows 200a, 200b.

Figure 14:
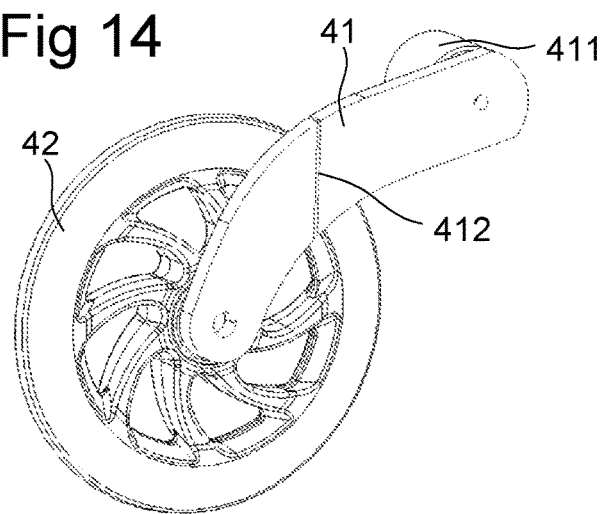
FIG. 14 shows a schematic perspective view of an embodiment of a pressure device.
Figure 16:
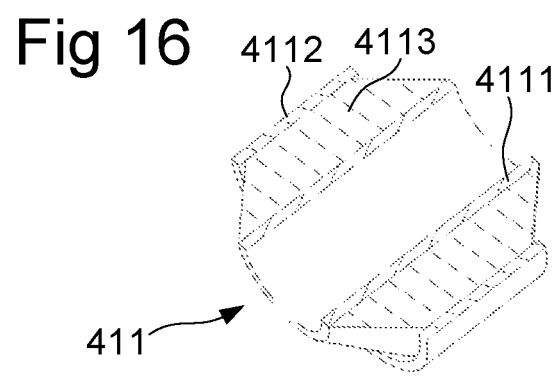
FIG. 16 shows a schematic cross-sectional perspective view of an embodiment of a suspension device.

FIG. 14 shows a pressure device comprising a press wheel arm 41 which at a distal end thereof carries a press wheel 42. At a proximal end of the press wheel arm 41, this can be provided with a spring device 411, which, with reference to FIG. 16, can comprise an inner sleeve 4111, an outer sleeve 4112 and a rubber elastic material 4113 arranged therebetween, which is preferably affixed to both the outer surface of the inner sleeve 4111 and the inner surface of the outer sleeve 4112. One of the inner sleeve 4111 or the outer sleeve 4112 can thus be connected to the press wheel arm 41 and the other one of the inner sleeve 4111 or the outer sleeve 4112 can be connected to the seed furrow-opening arm 21 or to a link part 45. The rubber elastic material 4113 permits a cushioned and dampened movement between the inner sleeve 4111 and the outer sleeve 4112.

The press wheel arm 41 can be bent with a view to achieving a desired geometry. In the example shown, there is a fold 412 across the press wheel arm 41, which separates a substantially plane proximal arm portion from a substantially plane distal arm portion so that there is an angle between these. The angle can be in the range of 160-179 degrees.

Figure 15:
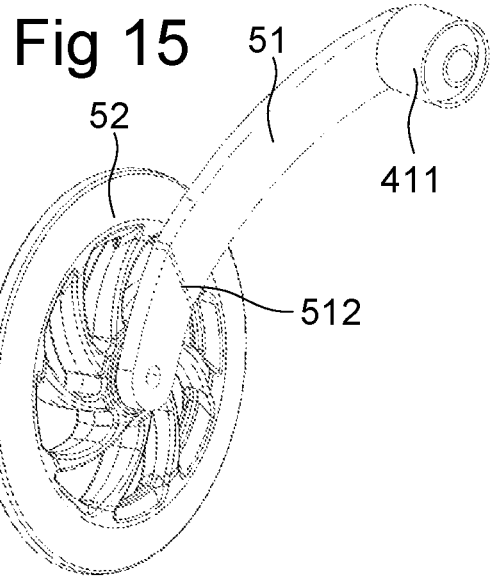
FIG. 15 shows a schematic perspective view of an embodiment of a seed furrow-sealer.

FIG. 15 shows a seed furrow-sealer comprising a seed furrow-sealing arm 51 which at a distal end thereof carries a seed furrow-sealing wheel 52. At a proximal end of the seed furrow-sealing arm 51, this can be provided with a spring device 411, which, with reference to FIG. 16, can comprise an inner sleeve 4111, an outer sleeve 4112 and a rubber elastic material 4113 arranged therebetween, which is preferably affixed to both the outer surface of the inner sleeve 4111 and the inner surface of the outer sleeve 4112. One of the inner sleeve 4111 or the outer sleeve 4112 can thus be connected to the seed furrow-sealing arm 41 and the other one of the inner sleeve 4111 or the outer sleeve 4112 can be connected to the seed furrow-opening arm 21 or to a link part 45. The rubber elastic material 4113 permits a cushioned and dampened movement between the inner sleeve 4111 and the outer sleeve 4112.

The seed furrow-sealing arm 51 can be bent with a view to achieving a desired geometry. In the example shown, there is a fold 512 across the seed furrow-sealing arm 51, which separates a substantially plane proximal arm portion from a substantially plane distal arm portion so that there is an angle between these. The angle can be in the range of 160-179 degrees.

In the above, a row unit and four different arrangements for controlling the setting for the ground pressure and the drilling depth of the row units respectively have been shown. Furthermore, two different arrangements for controlling the setting for the press wheels and/or the seed furrow-sealing wheels have been shown.

The row units can be controlled individually, in groups or all of them jointly.

For example, it possible to control all of the row units on one agricultural implement to the same ground pressure and depth, especially for agricultural implements that are less wide.

Figure 17:
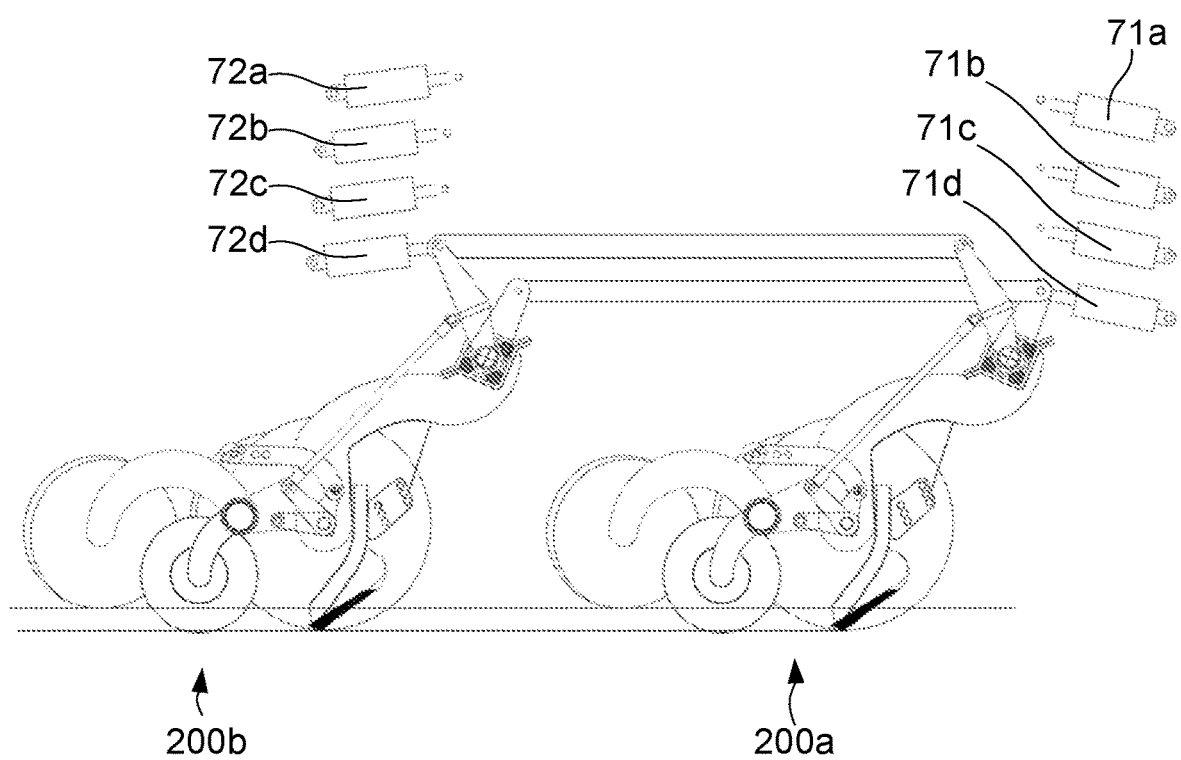
FIG. 17 shows a schematic side view of a set of row units according to a further embodiment.

FIG. 17 illustrates how a system can comprise a number of pressure-controlled hydraulic cylinders 71a-71d and/or a number of position-controlled hydraulic cylinders 72a-72d.

For agricultural implements with foldable side sections it is possible to control all row units belonging to a certain side section as one group, or even to divide a side section into two or more groups.

Particularly for wider agricultural implements, it is possible to control row units in groups, for example divided into groups of 2-10 row units.

Each group can be controlled by a pressure-controlled hydraulic cylinder 71a-71d and/or by a position-controlled hydraulic cylinder 72a-72d.

Alternatively, each group can be controlled by two or more pressure-controlled hydraulic cylinders 71a-71d and/ or by two or more position-controlled hydraulic cylinders 72a-72d.

In the event of two or more cylinders, they can be distributed across the length of a pivot axis 61, 62, in order to reduce torsional effects.

Furthermore, it has been shown how, in the direction of travel, two or more separated rows, or parts of rows, can be controlled using an actuator.

Finally, it is possible to control all row units individually, which probably means that each row unit has two actuators, one for setting the ground pressure and one for setting the drilling depth.

It is also noted that the row units shown herein are of a type which has one single seed disc and one single seed furrow-sealing wheel, which makes every row unit narrower.

The invention claimed is:

1. Agricultural implement, comprising an implement frame, which carries a number of row units for feeding granular material to a ground,
    wherein each row unit, comprises:
    a seed furrow-opener, which has a seed furrow-opening arm carrying a seed disc,
    wherein the seed furrow-opening arm has a proximal portion, in which the seed furrow-opening arm is pivotable about a first geometrical axis and a distal portion, to which the seed disc is rotatably attached,
    a depth regulator, which has a depth-regulating arm carrying a gauge wheel,
    wherein the depth-regulating arm is pivotable about a second geometrical axis which is concentric with a centre of rotation for the seed disc,
    wherein the row unit comprises a first adjusting device for setting the height of the gauge wheel in relation to the seed disc,
    wherein the first adjusting device comprises:
    a lever, which is fixedly connected to the depth-regulating arm,
    a depth-regulating driver arm pivotable at the first geometrical axis, and
    a control link, which connects distal portions of the lever and the depth-regulating driver arm, so that the pivotal position of the lever is controllable by pivoting the depth-regulating driver arm,
    wherein the agricultural implement further comprises:
    a first actuator, for setting a ground pressure effected by the seed discs, and
    a second actuator, for setting the height position of the gauge wheels relative to the seed discs, and
    a depth-regulating control arm, which is connected to the respective depth-regulating driver arm of at least two row units, wherein the second actuator is actively arranged between the implement frame and a distal portion of the depth-regulating control arm,
    wherein the depth-regulating control arm and the depth-regulating driver arm are pivotable about a common geometrical axis.

2. Agricultural implement according to claim 1, wherein the depth-regulating driver arm is pivotable about the first geometrical axis.

3. Agricultural implement according to claim 1, wherein a geometrical axis of rotation of the gauge wheel is displaced from a geometrical axis of rotation of the seed disc.

4. Agricultural implement according to claim 1, further comprising a pressure device, which has a press wheel arm connected to the seed furrow-opening arm and carrying a press wheel.

5. Agricultural implement according to claim 4, further comprising a suspension unit which is active between the press wheel and the seed furrow-opening arm so that the press wheel is pre-tensionable downward.

6. Agricultural implement according to claim 1, further comprising a seed furrow-sealer, which has a seed furrow-sealing arm connected to the seed furrow-opening arm and which carries a seed furrow-sealing wheel.

7. Agricultural implement according to claim 1, wherein the depth-regulating arm and the lever are located on axially opposite sides of the seed disc.

8. Agricultural implement according to claim 1, wherein the lever and the depth-regulating arm are fixed at respective end portions of an axis, which is concentric with a seed furrow-opening hub.

9. Agricultural implement according to claim 1, wherein one part of an axially distal portion of the gauge wheel connects to an axially exposed surface of the seed disc.

10. Agricultural implement according to claim 1, further comprising a seed channel with an orifice located within a periphery of the seed disc.

11. Agricultural implement according to claim 1, further comprising a first pivot axis, which is fixedly connected to a ground pressure operating arm and pivotable about a geometrical axis of rotation, wherein the first actuator is actively arranged between the implement frame and a distal portion of the ground pressure operating arm.

12. Agricultural implement according to claim 11, wherein the agricultural implement comprises a first row of said row units and, viewed in the direction of travel, a second row of said row units arranged behind the first row, wherein a ground pressure synchronization link is connected to a ground pressure operating arm of the first row and to a ground pressure operating arm of the second row.

13. Agricultural implement according to claim 1, wherein the first actuator is controllable for maintaining a predetermined ground pressure.

14. Agricultural implement according to claim 1, wherein the second actuator is controllable for maintaining a predetermined position.

15. Method of setting the drilling depth of at least two row units in an agricultural implement, wherein each of the row units comprises:
- a seed furrow-opener, which has a seed furrow-opening arm carrying a seed disc,
- wherein the seed furrow-opening arm has a proximal portion, in which the seed furrow-opening arm is pivotable about a first geometrical axis and a distal portion, to which the seed disc is rotatably attached,
- a depth regulator, which has a depth-regulating arm carrying a gauge wheel,
- wherein the depth-regulating arm is pivotable about a second geometrical axis which coincides with a centre of rotation for the seed disc,
- a first adjusting device comprising a depth-regulating driver arm, and
- wherein the agricultural implement further comprises:
- a depth-regulating control arm which is connected to the respective depth-regulating driver arms of at least two row units,
- wherein the depth-regulating control arm and the depth-regulating driver arm are pivotable about a common geometrical axis,
- wherein the method comprises:
- providing a pivoting about the common geometrical, and
- transferring the pivoting to the depth-regulating arm using the first adjusting device.

16. Method according to claim 15, further comprising transferring the pivoting using a depth-regulating driver arm which is pivotable about the depth-regulating pivot axis, a lever, which is fixedly connected to the depth-regulating arm, and a control link connected by distal portions of the depth-regulating driver arm and lever.

17. Method according to either claim 15, wherein the pivoting of the depth-regulating arm takes place about a geometrical axis which coincides with the geometrical axis of rotation of the seed disc.

18. Method according to claim 15, further comprising pivoting a press wheel arm, pivotably connected to the seed furrow-opening arm, which carries a press wheel, wherein the press wheel arm pivots in a synchronized manner with said pivoting of the depth-regulating arm.

19. Method according to claim 15, further comprising pivoting a seed furrow-sealing arm, pivotably connected to the seed furrow-opening arm, which carries a seed furrow-sealing wheel, wherein the seed furrow-sealing arm pivots in a synchronized manner with said pivoting of the depth-regulating arm.

* * * * *